(12) United States Patent
Nagashima

(10) Patent No.: US 6,748,444 B1
(45) Date of Patent: Jun. 8, 2004

(54) TRANSMISSION SYSTEM OF SHORT TIME LAG

(75) Inventor: Masaru Nagashima, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 622 days.

(21) Appl. No.: 09/609,937

(22) Filed: Jun. 30, 2000

(30) Foreign Application Priority Data

Nov. 26, 1999 (JP) .......................................... 11-335890

(51) Int. Cl.[7] .............................................. G06F 13/00
(52) U.S. Cl. ........................ 709/236; 709/224; 370/231
(58) Field of Search .............................. 709/200, 201, 709/220, 224, 225, 231, 232, 236; 370/230, 231, 232

(56) References Cited

U.S. PATENT DOCUMENTS

| | | | | |
|---|---|---|---|---|
| 4,894,819 A | * | 1/1990 | Kondo et al. ............... | 370/446 |
| 5,090,011 A | * | 2/1992 | Fukuta et al. ............... | 370/230 |
| 5,465,354 A | | 11/1995 | Hirosawa et al. ........... | 395/650 |
| 5,862,338 A | * | 1/1999 | Walker et al. .............. | 709/224 |
| 6,067,563 A | * | 5/2000 | Thomas et al. ............. | 709/212 |
| 6,094,434 A | * | 7/2000 | Kotzur et al. ............... | 370/401 |
| 6,483,845 B1 | * | 11/2002 | Takeda et al. .............. | 370/429 |

FOREIGN PATENT DOCUMENTS

| | | |
|---|---|---|
| JP | A5265775 | 10/1993 |
| JP | A667899 | 3/1994 |
| JP | A7152588 | 6/1995 |

* cited by examiner

Primary Examiner—Moustafa M. Meky
(74) Attorney, Agent, or Firm—Birch, Stewart, Kolasch & Birch, LLP

(57) ABSTRACT

A delay time period, such as the H/W process time period, and the S/W process time period needed for starting up a timer, and a time period from the task starting to the packet transmission beginning are predicted and stored in the control information in advance. A set value calculating part calculates a timer set value at the system initialization. In a packet forming part, the timer set value is set in a relative time timer for starting the timer. The relative time timer generates an interrupt after a specific elapse time has passed for starting a transmission requesting part. By dint of this, the time lag of the time period from the period interrupt to the packet transmission beginning can be reduced, and each of the formed packets is certainly requested to be transmitted within each requested time period for processing.

17 Claims, 20 Drawing Sheets

RELATED ART

TRANSMISSION SYSTEM OF SHORT TIME LAG

BACKGROUND OF THE INVENTION

1. Field of the Invention

This invention relates to a transmission system of short time lag (meaning a reduced small time lag) where a task is started, in the state that a delay time period, a timer interrupt process time period and the like are predicted, based on a periodic interrupt as a trigger, and a packet transmission is started within a limited time period (requested time period for processing).

2. Description of the Related Art

FIG. 19 shows a configuration of a task wait time controller used in a conventional computer system, disclosed in Unexamined Japanese Patent Publication HEI 7-152588. In FIG. 19, there provided a system bus 201, a CPU (Central Calculation Processing Unit) 202 for executing various information processes, a ROM (Read Only Memory) 203 for memorizing fixed data of operating system (OS), application program etc, a RAM (Random Access Memory) 204 for memorizing various variable data as a main memory, an input/output port 205 for receiving and transmitting data from/to an external device, a system timer 206, and a real timer 207.

In the task wait time controller for the conventional computer system as shown in FIG. 19, two timers are used for measuring a specified wait time period of task execution request. One is the system timer 206 which is usually used for outputting a periodic interrupt request at a regular cycle and the other is the real timer 207 which measures a remainder time calculated by subtracting an odd time period from a wait time period and dividing the subtracted time period by the regular cycle. By dint of using the two timers, the CPU does not need to execute a useless interrupt process and each task is started at an accurate timing designated by each specified wait time.

The task wait time controller set forth above has a problem that a delay time period of interrupt process in the H/W is not taken into consideration. The real timer wait queue setting process of FIG. 20 shows the case that a specified wait time is set as a set value of the real timer 207 at a step 211 when the specified wait time is larger than a regular cycle. In this case, there is a problem that a delay time period occurred during the steps from 211 up to 221 where the real timer 207 is actually started is not taken into the consideration. Therefore, it is difficult to accurately start up a task at the timing specified by the specified wait time of task execution request.

In the task execution requests, some are requesting to execute tasks when the specified time period has passed since the current time, and others are requesting to execute tasks within a specified limited time period. For instance, sensor data is transferred to a server through an Ethernet at a specified cycle, in the electric power substation. In this case, it is requested to complete processes up to starting the data transmission to the Ethernet within 225±25 µs based on an interrupt generated at a specific period as a reference. For dealing with this kind of request, it is not enough to execute a task after the specified time period having passed since the current time, as has been done in the conventional system. This is a problem of the conventional one.

One of the objects of the preferred embodiment of the present invention is to provide a transmission system of short time lag in which a packet transmission can be started within a limited time period based on a periodic interrupt as a trigger in the state that a delay time period, such as the time period of the H/W process responsive to an interrupt, the S/W process needed for starting up a timer, and a time period from the task starting to the packet transmission beginning are predicted, and in the state that a timer interrupt generation time for starting up the task is set based on the predicted time period. Another object is to lessen a time lag of the time period spent from the periodic interrupt to the packet transmission starting.

SUMMARY OF THE INVENTION

According to one aspect of a transmission system of the present invention, in which a packet is formed and transmitted within a specific time period, the transmission system comprises:

a periodic interrupt generating part for generating a periodic interrupt at intervals longer than the specific time period;

a relative time timer in which a specific timer set value is set, for generating an interrupt by measuring a specific elapse time based on the specific timer set value;

a control information memorizing part for memorizing control information used for calculating the specific elapse time measured by the relative time timer;

a set value calculating part for calculating the specific timer set value to be measured by the relative time timer, by using the control information memorized in the control information memorizing part;

a packet forming part, which is started when the periodic interrupt by the periodic interrupt generating part occurs, for setting the specific timer set value calculated by the set value calculating part in the relative time timer and forming a packet; and a transmission requesting part, which is started when the interrupt by the relative time timer occurs, for transmitting the packet formed by the packet forming part.

According to one aspect of a transmission method for the transmission system of the present invention, in which a packet is formed and transmitted within a specific time period, the transmission method comprises:

generating a periodic interrupt at intervals longer than the specific time period;

generating an interrupt by measuring a specific elapse time based on a specific timer set value;

memorizing control information used for calculating the specific elapse time;

calculating the specific timer set value to be measured by a relative time timer, by using the control information;

when the periodic interrupt occurs, setting the specific timer set value in the relative time timer and forming a packet; and when the interrupt occurs, transmitting the packet.

The above-mentioned and other objects, features, and advantages of the present invention will be made more apparent by reference to the following detailed description when taken in conjunction with the accompanying drawings.

DETAILED DESCRIPTION OF THE PREFERRED EMBODIMENTS

Embodiment 1

Figure 1:
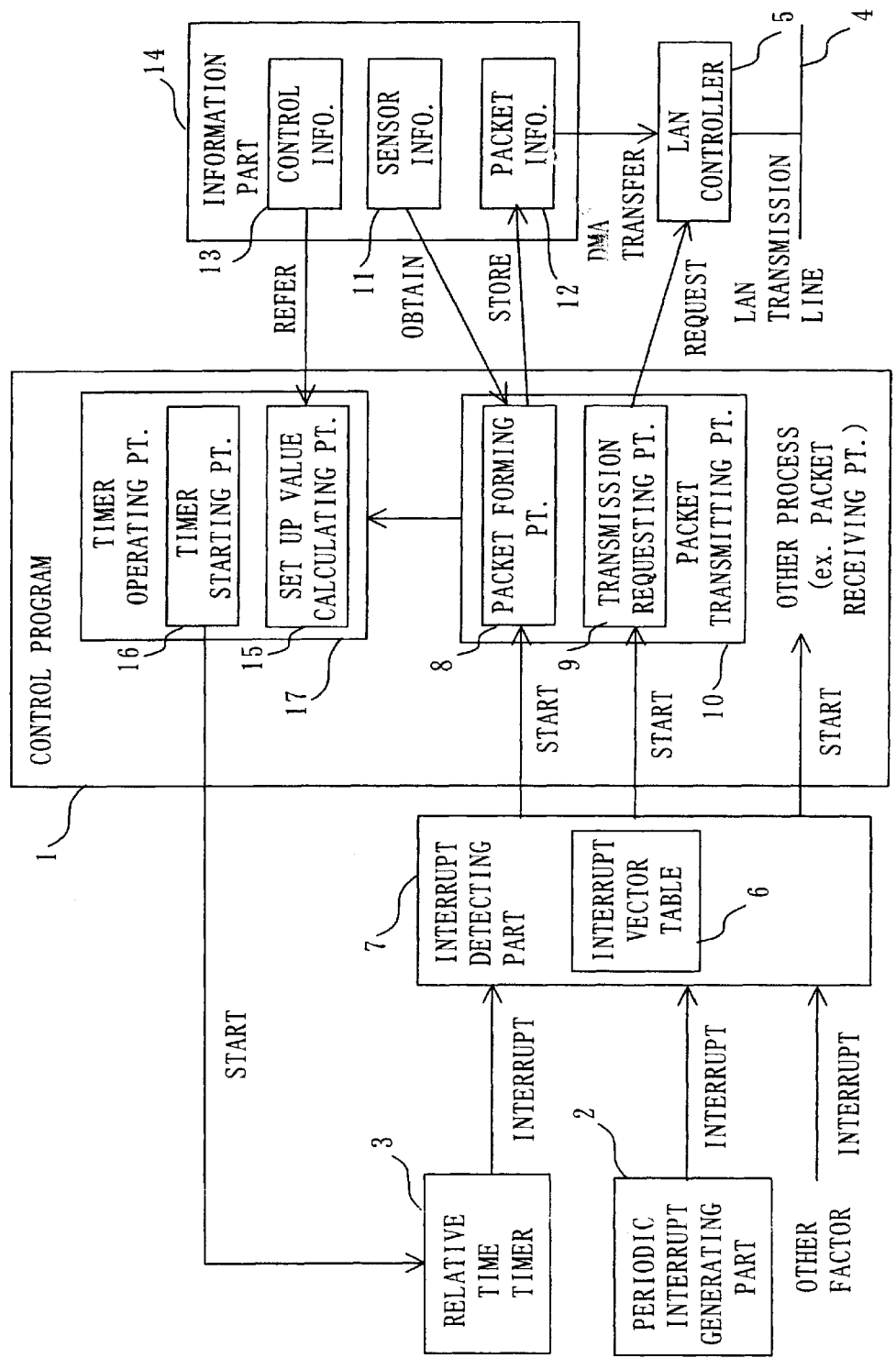
FIG. 1 shows a basic theory of a transmission system of short time lag according to Embodiment 1 of the present invention.

FIG. 1 shows a basic theory of a transmission system of short time lag according to Embodiment 1 of the present invention. In FIG. 1, the followings are provided: a control program 1 for controlling operations of the transmission system of short time lag according to the present Embodiment, a periodic interrupt generating part 2 by which a periodic interrupt is generated at a specific time interval, a relative time timer 3 by which a timer interrupt is generated after a specified time period has passed, a LAN transmission line 4, a LAN controller 5 for transmitting a packet formed in the control program 1 to the LAN transmission line 4 based on a direction of the control program 1, an interrupt vector table 6 which memorizes relations between interrupts and process tasks to be started responsive to the interrupts, an interrupt detecting part 7 for detecting interrupts by the periodic interrupt generating part 2 or the relative time timer 3 and starting a process task corresponding to the detected interrupt based on the interrupt vector table 6, a packet forming part 8 for forming a packet to be output to the LAN transmission line 4 by being started responsive to an interrupt from the periodic interrupt generating part 2, a transmission requesting part 9 for requesting the LAN controller 5 to transmit the packet formed by the packet forming part 8 by being responsive to an interrupt from the relative time timer 3, a packet transmitting part 10 composed of the packet forming part 8 and the transmission requesting part 9 for executing processes from the packet forming to the packet transmission requesting, a sensor information 11 for storing the latest sensor data updated at every periodic interrupt to be transmitted as a packet, a packet information 12 for storing packets formed by the packet forming part 8 based on the sensor information 11, a control information 13 for storing data related to a predicted delay time period of the control program 1, the number of packets to be transmitted to the LAN transmission line 4 at every periodic interrupt occurrence, a limited time period needed from the time of the periodic interrupt generation to the time of the transmission request to the LAN controller 5, and so on, an information part 14 composed of the sensor information 11, the packet information 12, and the control information 13, which memorizes information and is located on the memory, a set value calculating part 15 for predicting and calculating a time at which a timer interrupt is generated by the relative time timer 3, based on the control information 13, a timer starting part 16 for starting the relative time timer 3 based on a timer set value calculated by the set value calculating part 15, and a timer operating part 17 composed of the set value calculating part 15 and the timer starting part 16.

Figure 2:
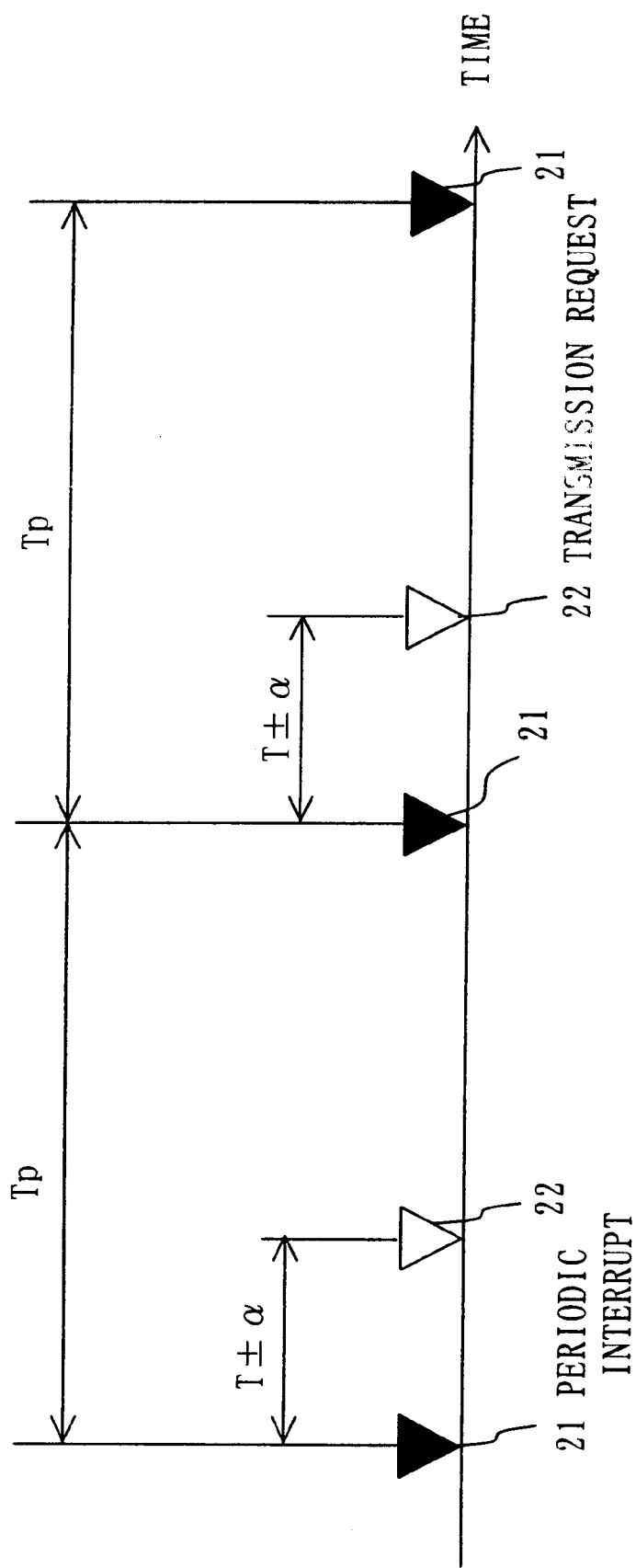
FIG. 2 shows system requests according to Embodiment 1 of the present invention.

In FIG. 2 showing system requests, a periodic interrupt 21 indicates a time at which an interrupt from the periodic interrupt generating part 2 is generated. The periodic interrupt 21 occurs at intervals of a specific time Tp. A transmission request 22 indicates a time at which the transmission requesting part 9 makes a request to the LAN controller 5.

In this Embodiment 1, the control program 1 transmits one packet at every periodic interrupt 21. It is supposed there exists a time limit that the transmission request 22 should be issued within T±α of the periodic interrupt 21. T stands for a requested time period for processing requested by the system. α stands for a tolerable time lag of the requested time period T for processing.

Figure 3:
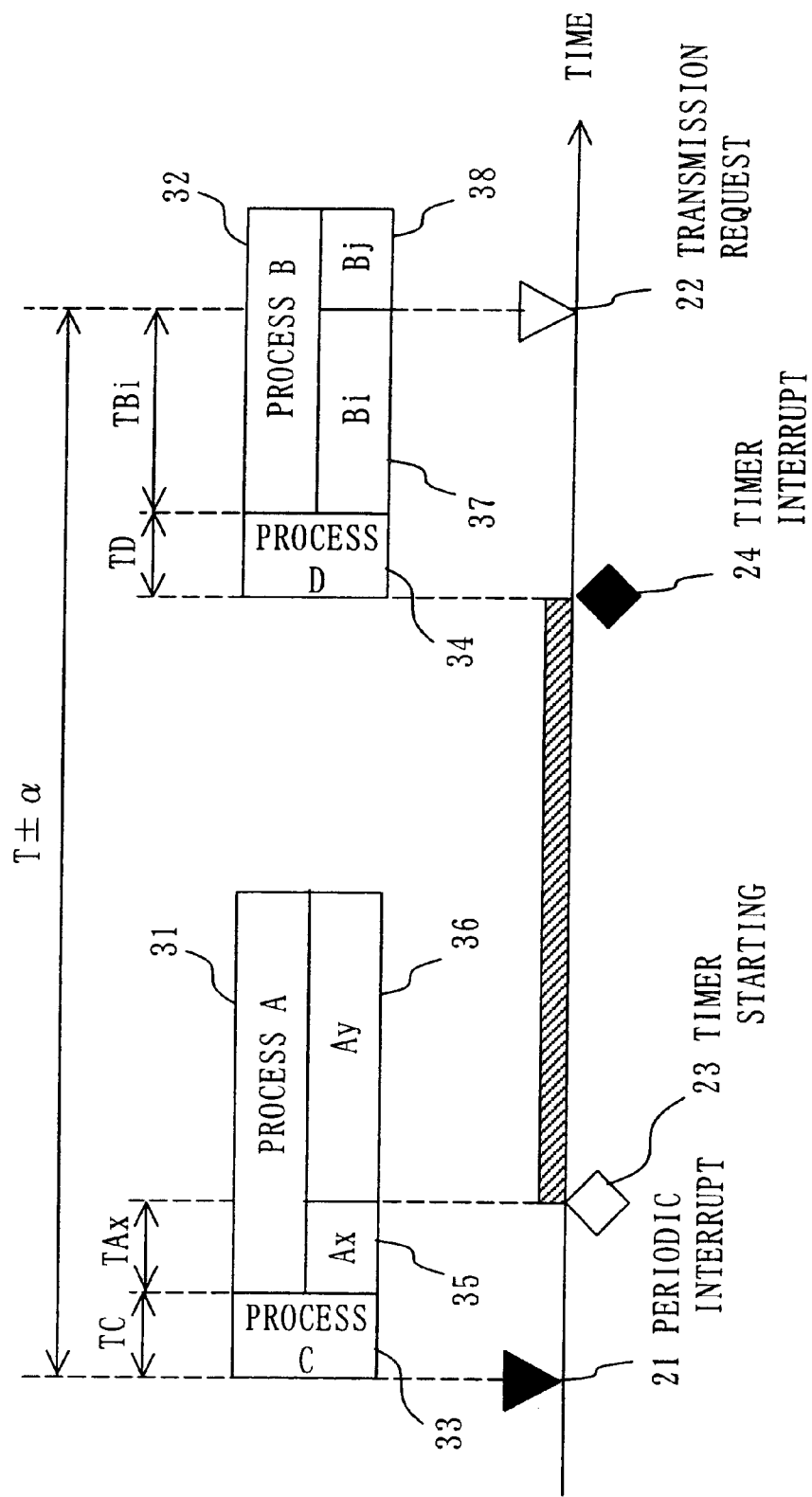
FIG. 3 shows processes from the periodic interrupt 21 to the transmission request 22 of FIG. 2.

FIG. 3 shows processes from the periodic interrupt 21 to the transmission request 22 of FIG. 2. A timer start 23 indicates the time at which the timer starting part 16 starts up the relative time timer 3. A timer interrupt 24 occurs after the time set in the relative time timer 3 has passed.

Process A 31 indicates an interrupt handler responsive to the periodic interrupt 21 from the periodic interrupt generating part 2, that is the processes of the packet forming part 8 and the timer operating part 17. Process B 32 indicates an interrupt handler responsive to the timer interrupt 24 from the relative time timer 3, that is the process of the transmission requesting part 9. A process C 33 indicates a H/W process responsive to the periodic interrupt 21 and a process D 34 indicates a H/W process responsive to the timer interrupt 24.

The process A 31 is supposed to be divided into two at the timer start 23. A process Ax 35 in the process A 31 indicates the process from the first instruction of the packet forming part 8 to the timer start 23. A process Ay 36 in the process A 31 indicates the process from the timer start 23 to the last instruction of the packet forming part 8.

The process B 32 is supposed to be divided into two at the transmission request 22 to the LAN controller 5 performed by the transmission requesting part 9. A process Bi 37 in the process B 32 indicates the process from the first instruction of the transmission requesting part 9 to the transmission request 22. A process Bj 38 in the process B 32 indicates the process from the transmission request 22 to the last instruction of the transmission requesting part 9.

The time period for each process is defined as follows: the time period necessary for the process Ax 35 is TAx (timer-set-predicted-time-period), the time period necessary for the process Bi 37 is TBi (transmission-request-predicted-time-period), the time period necessary for the process C 33 is TC (the first process time period or the predicted delay time period), and the time period necessary for the process D 34 is TD (the second process time period or the predicted delay time period).

In the transmission system of short time lag, the transmission requesting part 9 is started in order to issue the transmission request 22, by generating the timer interrupt 24 with using the relative time timer 3 after a specific time period has passed. This specific time period is calculated by subtracting TAx+TBi+TC+TD from the requested time period T for processing, meaning (Requested Time Period T for Processing)−(TAx+TBi+TC+TD), that is the time period expressed by the slanted lines in FIG. 3.

According to the above, it is possible to issue the transmission request 22 within the limited time period (T±α) of the periodic interrupt 21. In addition, it is guaranteed that the accurate time is kept at the time period from the timer start 23 to the timer interrupt 24 because the time period is correctly measured by using the relative time timer 3. Therefore, factors of the time lag can be restricted to be the process Ax 35, the process Bi 37, the process C 33 or the process D34, meaning the process from the periodic interrupt 21 to the timer start 23 or the process from the timer interrupt 24 to the transmission request 22. By way of predicting the time period for these processes, the time lag (time error) with respect to the real time can be lessened. The time lag can be reduced by making the sum of the time errors be within α. In addition, the process efficiency can be enhanced by executing other processes such as a packet receiving in the time period between the packet forming and the transmission request. This time period is expressed in FIG. 3 to be between ((the process C+the process A): packet forming) and ((the process D+the process B): transmission request), that is a part of the slanted lines illustrated in FIG. 3.

Figure 4:
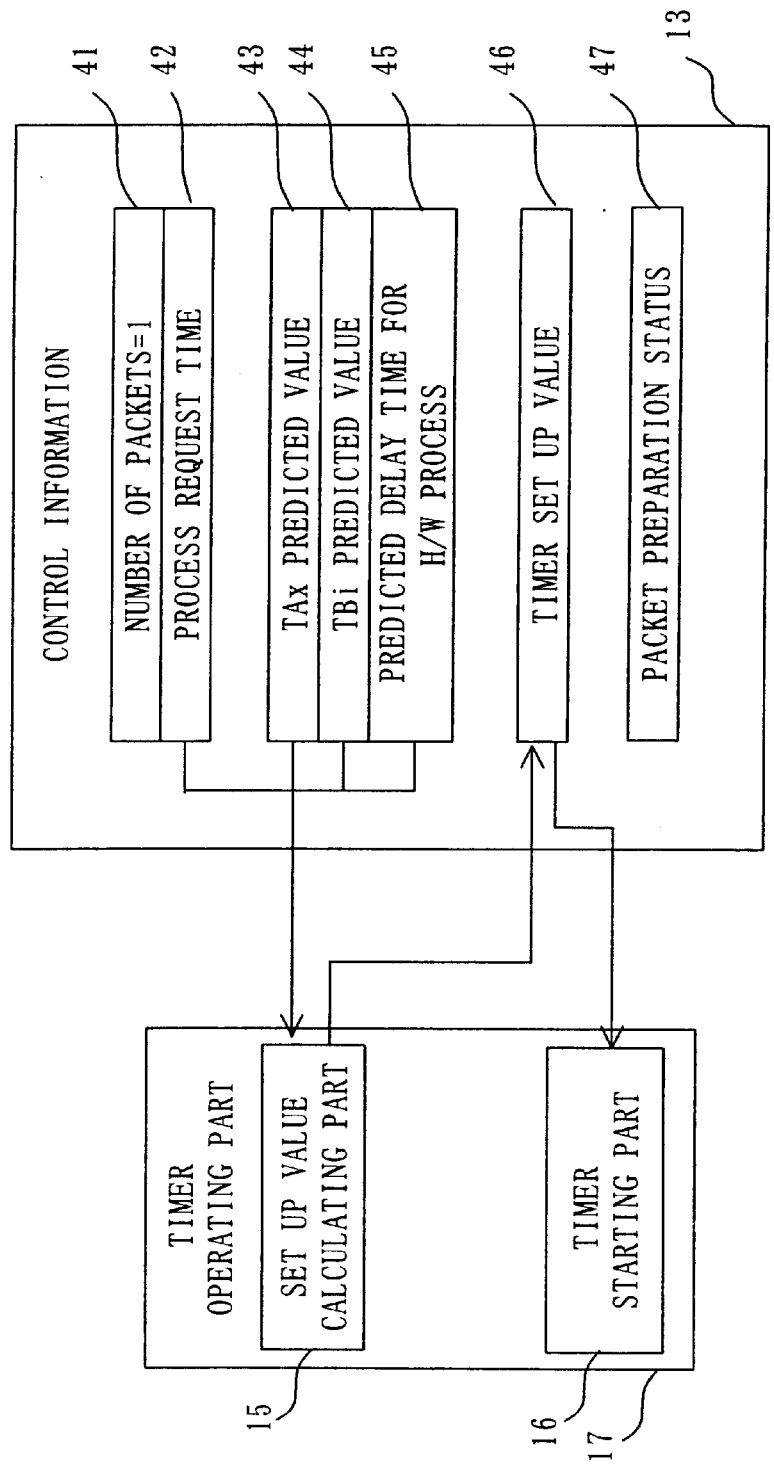
FIG. 4 shows processes performed between the timer operating part 17 and the control information 13 according to Embodiment 1 of the present invention.

FIG. 4 shows processes performed between the timer operating part 17 and the control information 13. Number of packets 41 indicates the number of packets to be transmitted to the LAN transmission line 4 at every periodic interrupt 21. In this Embodiment 1, it is supposed that the packet forming part 8 forms one packet at one starting of the packet forming part 8. Therefore, "1" is set as the number of packets 41 by the packet forming part 8. The number of packets 41 is set only once at the system initialization and the number of packets 41 is not renewed. A requested time period 42 for processing indicates the requested time period T for performing processes from the periodic interrupt 21 to the transmission request 22, requested by the system.

A TAx predicted value 43 (timer-set-predicted-time-period) indicates a predicted process time period needed for the process Ax 35. A TBi predicted value 44 (transmission-request-predicted-time-period) indicates a predicted process time period needed for the process Bi 37. A predicted delay time period 45 of H/W process (the first process time period, the second process time period) indicates a predicted process time period needed for H/W process performed responsive to the interrupt. Each of the process time period TC necessary for the process C 33 and the process time period TD necessary for the process D 34 corresponds to the predicted delay time 45 of H/W process. Namely, the same value is used for the process time periods TC and TD.

A timer set value 46 indicating a specific time period is set in the relative time timer 3 based on the calculation of the requested time period 42 for processing, the TAx predicted value 43, the TBi predicted value 44 and the predicted delay time period 45 of H/W process calculated by the set value calculating part 15.

A packet preparation status 47 shows whether packets to be transmitted to the LAN transmission line 4 exist or not. The packet preparation status 47 is set at the time when the packet forming part 8 stores a packet into the packet information 12. The packet preparation status 47 is cleared at the time when the transmission requesting part 9 issues a transmission request to the LAN controller 5.

An error occurs in TC of FIG. 3 by the instruction just being executed when the periodic interrupt 21 is generated or by the existence of cache or not. Similarly, an error occurs in TD of FIG. 3 by the instruction just being executed when the timer interrupt 24 is generated or by the existence of cache or not. Information regarding the process interrupted by the packet forming part 8 or the transmission requesting part 9 is temporarily saved. For instance, all the local register values of the processor are saved or the stack area is switched. These temporary savings are sometimes processed by S/W in some processors, while such savings are processed in the process C 33 and the process D 34 in this case of Embodiment 1.

It is impossible for the control program 1 to know the real time period of TC or TD spent on performing the above H/W process. Therefore, in order to obtain the predicted delay time period 45 of H/W process, a middle value is calculated between a predicted maximum value and a predicted minimum value regarding the time period from an interrupt detection by the interrupt detecting part 7 to a starting of an interrupt handler meaning the packet forming part 8 or the transmission requesting part 9.

Information relating to a time period needed for the S/W (interrupt handler) starting is disclosed in some CPU specification with the conditions of instructions being executed at the time of interrupt occurrence, the cache using, and so on. As the real time period is unknown, a predicted maximum value and a predicted minimum value calculated based on the above disclosed time period are used for predicting the real time period.

Supposing that the minimum value of the process C is TCmin and the maximum value of the process C is TCmax, a TC predicted value (the first process time period) is calculated to be (TCmin+TCmax)/2. Similarly, supposing that the minimum value of the process D is TDmin and the maximum value of the process D is TDmax, a TD predicted value (the second process time period) is calculated to be (TDmin+TDmax)/2.

Regardless of kinds of the interrupt handler to be started, the minimum value and the maximum value always keep their values. Therefore, the TC predicted value is equal to the TD predicted value. Then, the TC predicted value or the TD predicted value is regarded as the predicted delay time period 45 of H/W process.

If the real time period of the process C is TCmax (maximum value), the time error with respect to the real time period and the predicted value is "TCmax−TC predicted value". Similarly, if the real time period of the process C is TCmin (minimum value), the time error with respect to the real time period and the predicted value is "TC predicted value-TCmin". The calculated value of "TCmax-TC predicted value" is equal to that of "TC predicted value-TCmin". Since the processes C and D are not taken into consideration under the conventional art, the value range of the error is from TCmin (minimum) to TCmax (maximum). In this Embodiment 1, the value of the error is from 0 (minimum) to "TC predicted value-TCmin" (maximum). The time lag can be reduced by narrowing the range of the error between the real time period and the predicted value.

As stated above, the time lag of the delay time period of H/W process can be reduced in the transmission system of short time lag according to the present invention by using the middle value of predicted time values relating to the time period from detecting the interrupt to starting the interrupt handler. In this case, the time lag is calculated by "(TCmax (TDmax))-(predicted delay time period 45 of H/W process).

Figure 5:
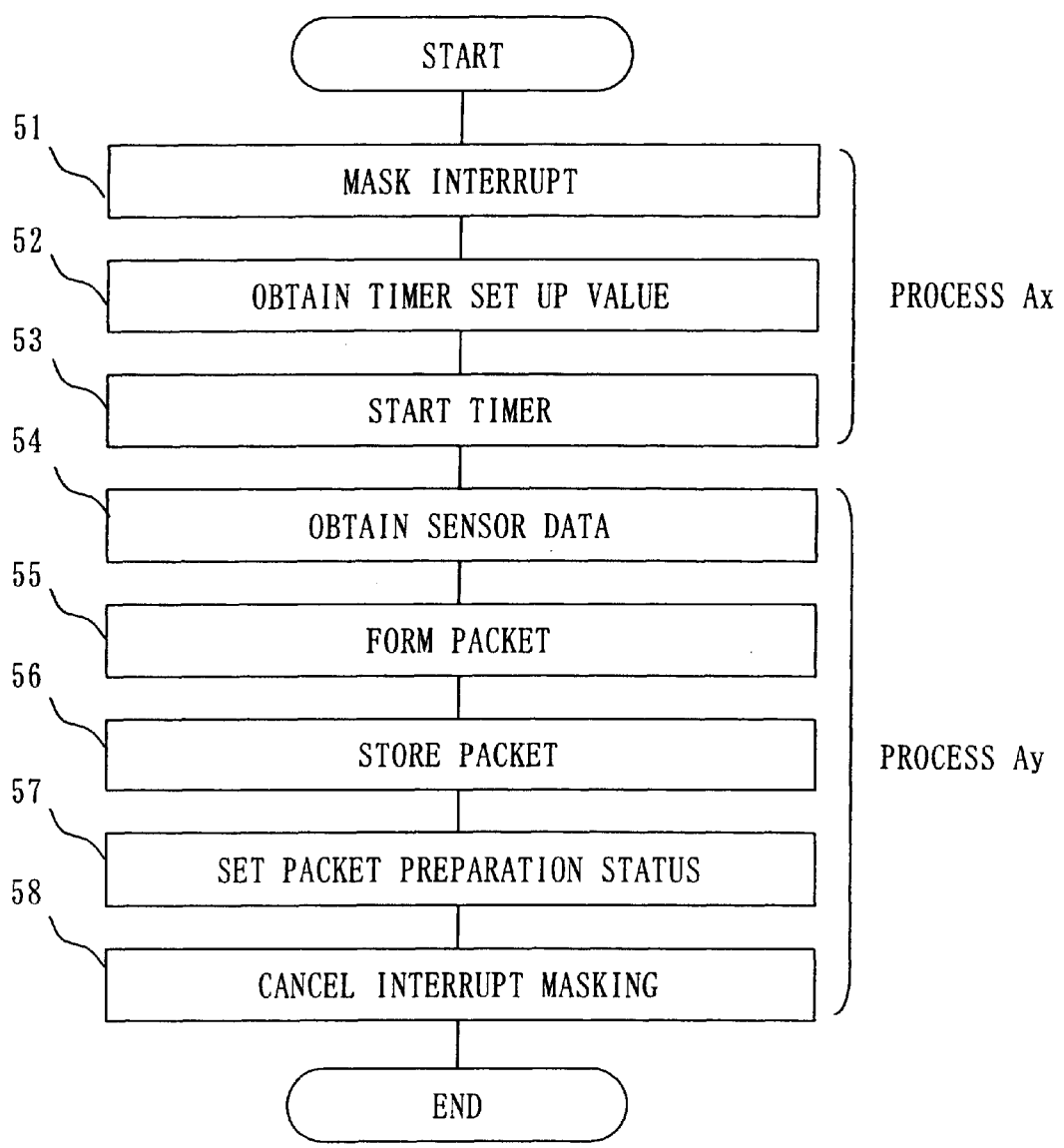
FIG. 5 shows a process flowchart of the process A 31 according to Embodiment 1 of the present invention.

FIG. 5 shows a process flowchart of the process A 31. The process A 31 is executed in the state that all the interrupts are masked and no other interrupt handler is started even when an interrupt is detected by the interrupt detecting part 7.

At a step 51, after the packet forming part 8 has been started based on the periodic interrupt 21, the interrupt detecting part 7 masks all the interrupts. At a step 52, the timer starting part 16 obtains the timer set value 46. At a step 53, the timer starting part 16 starts the relative time timer 3 based on the timer set value 46. Otherwise, it is also acceptable that the packet forming part 8 instead of the timer starting part 16 obtains the timer set value 46 and starts the relative time timer 3 based on the timer set value 46.

The relative time timer 3 begins to operate when a time is set in the relative time timer 3. Concretely, a counting of the counter is decreased depending on a clock, and when the counting becomes zero (0), an interrupt is generated. Therefore, an accurate time can be secured. The steps 51 through 53 correspond to the process Ax 35 of FIG. 3.

At a step 54, the packet forming part 8 obtains sensor data to be output as a packet, from the sensor information 11. At a step 55, the packet forming part 8 forms a packet by making the obtained sensor data be a packet. At a step 56, the packet forming part 8 stores the formed packet in the packet information 12. At a step 57, the packet forming part 8 sets the information indicating that a packet preparation has been finished, in the packet preparation status 47. At a step 58, the interrupt detecting part 7 cancels the masking of the interrupt and resets the state of the interrupt handler to be ready for starting based on a detected interrupt. The steps 54 through 58 correspond to the process Ay 36 of FIG. 3.

The process Ax 35 is composed of the minimum processes such as an operation for the register in the processor and an access to the timer set value 46 stored in the memory area in which caching is not performed. Since the process Ax 35 is executed in the state that an interrupt is prohibited, a delay caused by other task interrupt is not generated.

Under the conditions stated above, the process time period needed for the process Ax 35 is predicted in advance based on the number of instructions, access times to the memory, and so on. Predicting the process time period is done by reversing the object program to the assembly language and counting the execution times of the instructions reversed in an assembler (=instructions to be recognized by CPU) level. The number of instructions and the times of memory access in the part to be predicted can be fixed by simplifying processes.

As stated above, the predicting is not performed while the program is being executed. A programmer who creates a program predicts the process time at the program creating step and calculates a predicted value. As the programmer knows a program range to be predicted in the assembler instruction level, it is possible for the programmer to predict the process time period. The predicted process time period is stored in the control information 13 as the TAx predicted value 43.

Since the process Ax 35 is composed of the minimum processes and performed in the state that all the interrupts are prohibited, it is easy to predict the time TAx needed for performing the process Ax 35. In addition, it is possible to reduce the time lag of the transmission request 22 by dint of predicting the delay time period of the process Ax 35.

Figure 6:
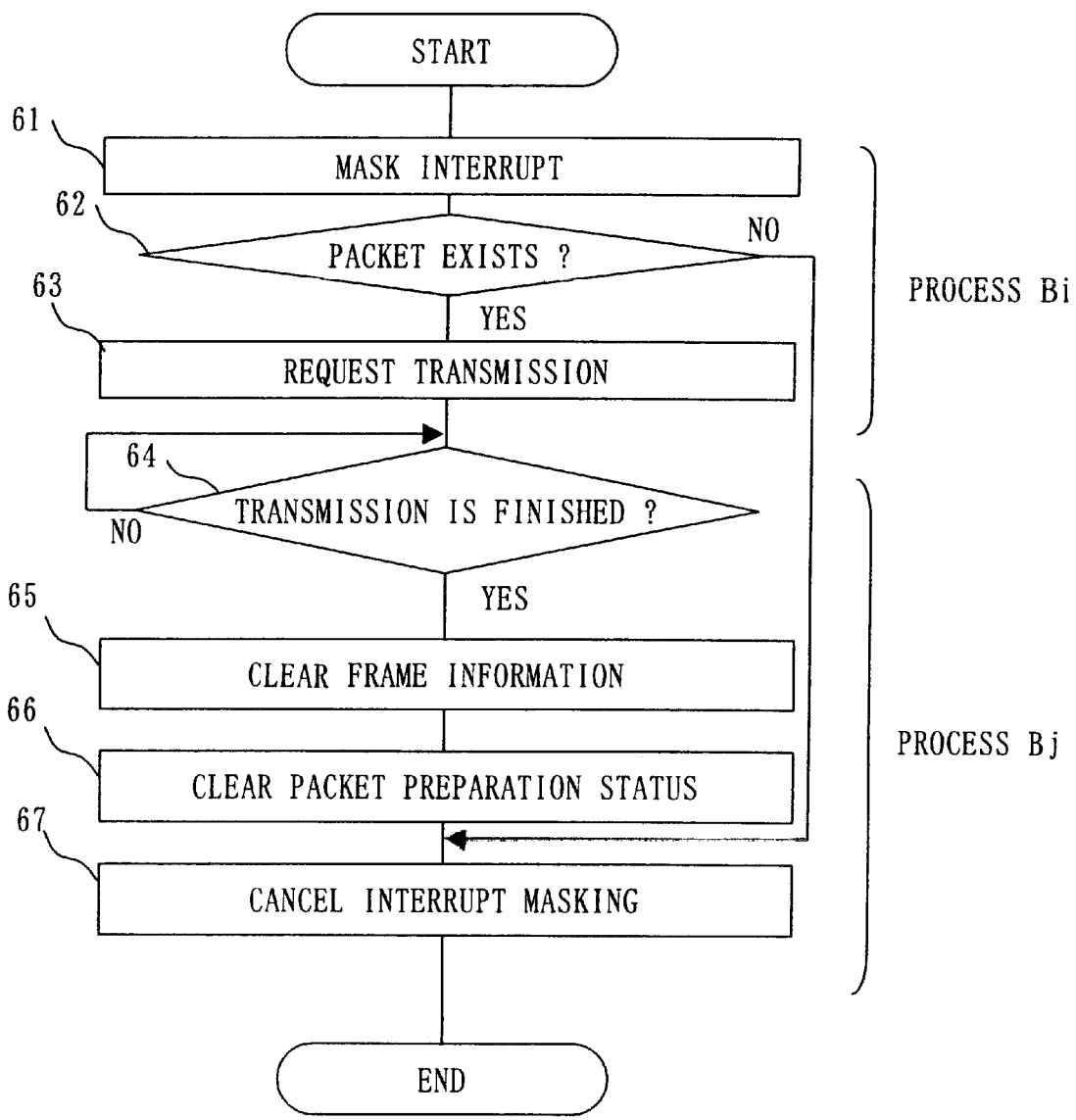
FIG. 6 shows a process flowchart of the process B 32 according to Embodiment 1 of the present invention.

FIG. 6 shows a process flowchart of the process B 32. The process B 32 is performed in the state that all the interrupts are masked and no other interrupt handler is started even when an interrupt is detected by the interrupt detecting part 7.

At a step 61, after the transmission requesting part 9 has been started based on the timer interrupt 24, the interrupt detecting part 7 masks all the interrupts. At a step 62, the transmission requesting part 9 checks whether or not there is a packet to be output from the packet preparation status 47 in the control information 13. At a step 63, the transmission requesting part 9 designates a packet to be transmitted and requests the LAN controller 5 to transmit the designated packet. The steps 61 through 63 correspond to the process Bi 37 of FIG. 3.

At a step 64, the transmission requesting part 9 checks whether the transmission has been finished or not. At a step 65, the packet information 12 which has been already transmitted is cleared for the purpose of storing a next packet. However, it is not always necessary for the steps 64 and 65 to be performed in the process B 32. At a step 66, the transmission requesting part 9 clears the packet preparation status 47. At a step 67, the interrupt detecting part 7 cancels the masking of the interrupt and resets the state of the interrupt handler to be ready for starting based on a detected interrupt. The steps 64 through 67 correspond to the process Bj 38 of FIG. 3.

The process Bi 37 as well as the process Ax 35 is composed of the minimum processes such as an operation for the register in the processor and an access to the packet preparation status 47 stored in the memory area in which caching is not performed. Since the process Bi 37 is executed in the state that an interrupt is prohibited, a delay caused by other task interrupt is not generated.

Under the conditions stated above, the process time period needed for the process Bi 37 is predicted in advance based on the number of instructions, access times to the memory, and so on. Predicting the time period needed for the process Bi 37 is done by reversing the object program to the assembly language and counting in an assembler (=instructions to be recognized by CPU) level. The number of instructions and the times of memory access in the part to be predicted can be fixed by simplifying processes.

As stated above, the prediction is not performed while the program is being executed. The programmer who creates a program predicts the process time at the program creating step and calculates a predicted value. As the programmer knows an aimed range at the assembler instruction level, it is possible for the programmer to predict the process time period. The predicted process time period is stored in the control information 13 as the TBi predicted value 44.

Since the process Bi 37 is composed of the minimum processes and performed in the state that all the interrupts are prohibited, it is easy to predict the time TBi needed for performing the process Bi 37. In addition, it is possible to reduce the time lag of the transmission request 22 by dint of predicting the delay time period of the process Bi 37.

In the transmission system of short time lag whose configuration has been stated above, as the timer set value 46 is the time period from the timer start 23 to the timer interrupt 24, it is necessary to set a value calculated by subtracting the delay time period of H/W process and the delay time period of S/W process from the requested time period 42 for processing, in the relative time timer 3. Since it is impossible to measure a real delay time period of the H/W process and the S/W process, predicted values for them are used.

The set value calculating part 15 calculates the timer set value 46 by calculating "(the requested time period 42 for processing)–{(TAx predicted value 43)+(TBi predicted value 44)+(predicted delay time period 45 of H/W process)× 2}", based on the control information 13.

As the timer set value 46 includes the delay time periods of the H/W process and the S/W process, the transmission request 22 can be issued within the limited time period. Besides, it is possible to reduce the time lag of the time period from the periodic interrupt 21 to the transmission request 22.

Since the TAx predicted value 43, the TBi predicted value 44, and the predicted delay time period 45 of H/W process are fixed values, the values 43, 44, and 45 calculated at the system initialization are stored in the control information 13 as the timer set value 46.

In FIG. 4, the timer set value 46 and the packet preparation status 47 are stored in the memory area where caching is not performed, and so they are not to be in the cache memory even when they are accessed.

As the other parameters in the control information 13, meaning the requested time period 42 for processing, the TAx predicted value 43, the TBi predicted value 44 and the predicted delay time period 45 of H/W process, are used only for calculating the timer set value 46 at the system initialization, they can be allocated anywhere in the memory.

Since the timer set value 46 and the packet preparation status 47 are stored in the memory area in which caching is not performed as stated above, it is easy to predict the process time periods of the process Ax 35 and the process Bi 37.

The timer starting part 16 only refers to the timer set value 46 stored in the control information 13 when the relative time timer 3 is started. Accordingly, the calculation time for obtaining the TAx predicted value 43, the TBi predicted value 44 and the predicted delay time period 45 of H/W process at every necessary occasion can be saved, which makes the process time period shortened. Besides, with reference to the step 53 of the process Ax 35 in FIG. 5, where the timer is started, since the timer starting part 16 refers to only the timer set value 46, the time for calculation at every necessary occasion can be saved. As the process Ax 35 is simplified, it can be expected that a time error between the real process time period of the process Ax 35 and the predicted process time period is lessened.

Embodiment 2

Figure 7:
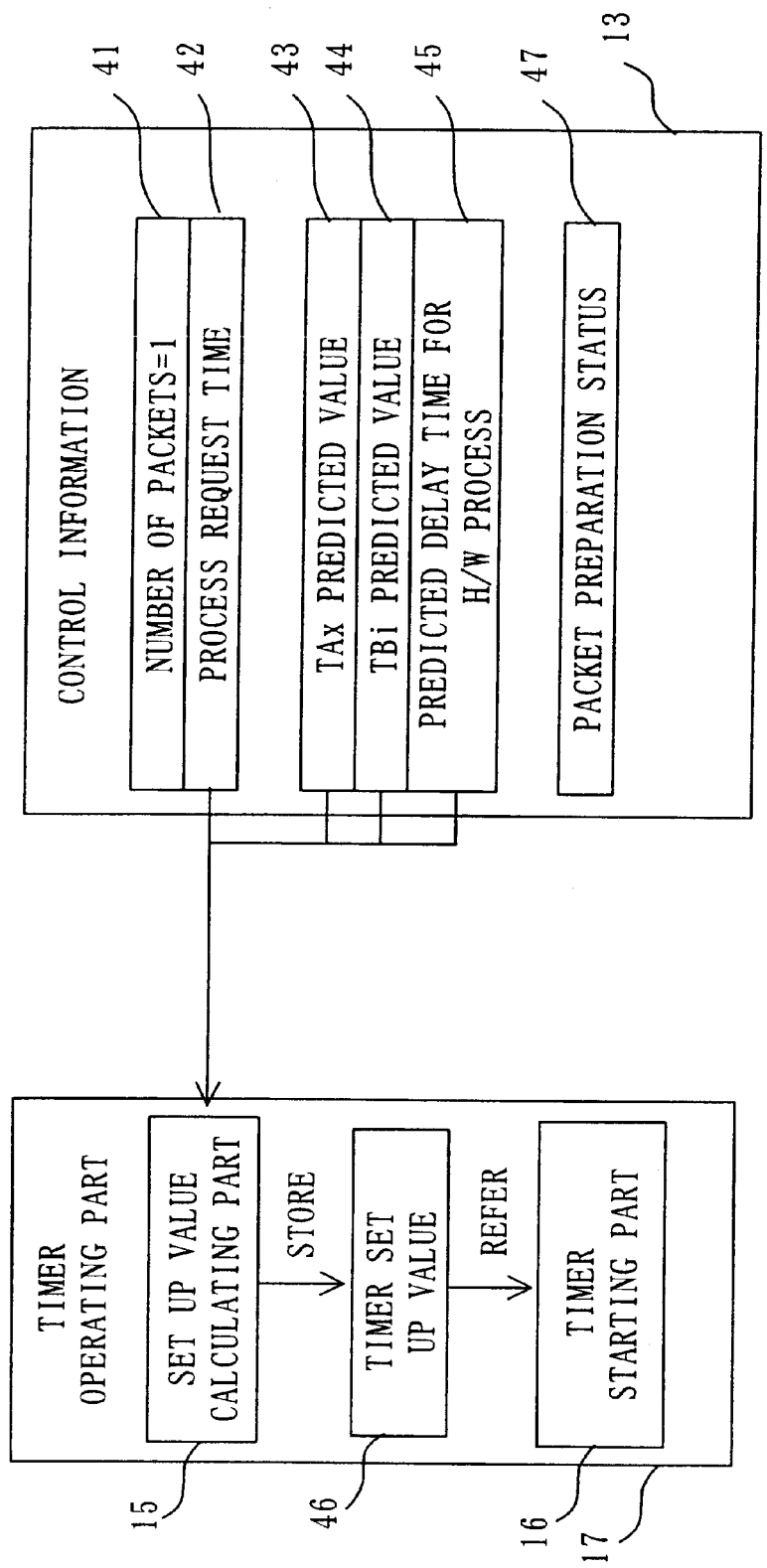
FIG. 7 shows processes performed between the timer operating part 17 and the control information 13 according to Embodiment 2 of the present invention.

FIG. 7 shows processes performed between the timer operating part 17 and the control information 13. Referential signs corresponding to those in FIG. 4 indicate the same contents.

In Embodiment 1, the timer set value 46 is stored in the memory area where caching is not performed, of the control information memorizing part. However, it is also acceptable to store the timer set value 46 in a global register of the processor in stead of the control information 13 of the control information memorizing part. As the global register is used in common by the packet forming part 8, the transmission requesting part 9, and the process interrupted by the periodic interrupt 21 or the transmission request 22, it is not necessary to save the data in the global register even when the task is switched. The same operations as Embodiment 1 can be performed in the above configuration of Embodiment 2.

Embodiment 3

In the present Embodiment 3, one example of the transmission system will be described in which the packet forming part forms two or more than two packets during a period and the formed packets are transmitted within the requested time period for processing in the period.

Figure 8:
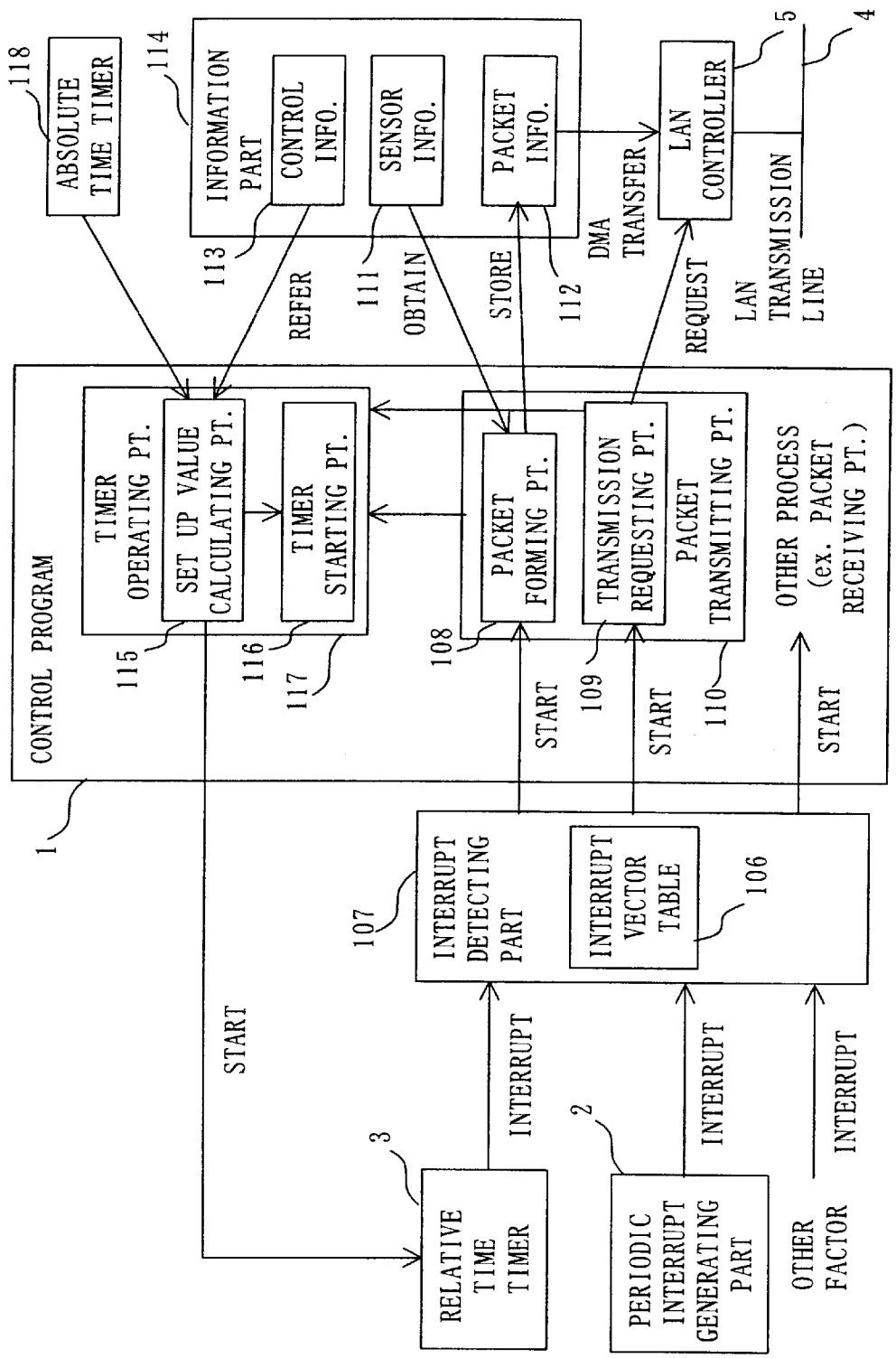
FIG. 8 shows a basic theory of a transmission system of short time lag according to Embodiment 3 of the present invention.

FIG. 8 shows a basic theory of the transmission system of short time lag according to Embodiment 3 of the present invention. Referential signs corresponding to those in FIG. 1 indicate the same processes.

An interrupt vector table 106 shows relations between interrupts and process tasks to be started up responsive to the interrupts, and process priorities for each process task. An interrupt detecting part 107 detects an interrupt by the periodic interrupt generating part 2 or the relative time timer 3, and starts a process task corresponding to the interrupt based on the interrupt vector table 106. A packet forming part 108 forms two packets to be output to the LAN transmission line 4, by being started responsive to an interrupt from the periodic interrupt generating part 2. A transmission requesting part 109 requests the LAN controller 5 to transmit the two packets formed by the packet forming part 108, by being started responsive to an interrupt from the relative time timer 3. The transmission requesting part 109 requests to transmit one packet at one starting execution. A packet transmitting part 110 composed of the packet forming part 108 and the transmission requesting part 109 executes processes from the packet forming to the transmission request.

A sensor information 111 stores the latest sensor data updated by every periodic interrupt to be transmitted as a packet. A packet information 112 stores packets formed by the packet forming part 108 based on the sensor information 111. A control information 113 stores data related to a predicted delay time period of the control program 1, the number of packets to be transmitted to the LAN transmission line 4 at every periodic interrupt occurrence, a limited time period needed from the time of the periodic interrupt occurrence to the time of the transmission request to the LAN controller 5, and so on. An information part 114 composed of the sensor information 111, the packet information 112, and the control information 113 is located on the memory as a control information memorizing part.

A set value calculating part 115 predicts and calculates a time at which a timer interrupt is generated, based on the control information 113. A timer starting part 116 starts the relative time timer 3 based on the timer set value calculated by the set value calculating part 115. A timer operating part 117 is composed of the set value calculating part 115 and the timer starting part 116. An absolute time timer 118 controls the current time.

Figure 9:
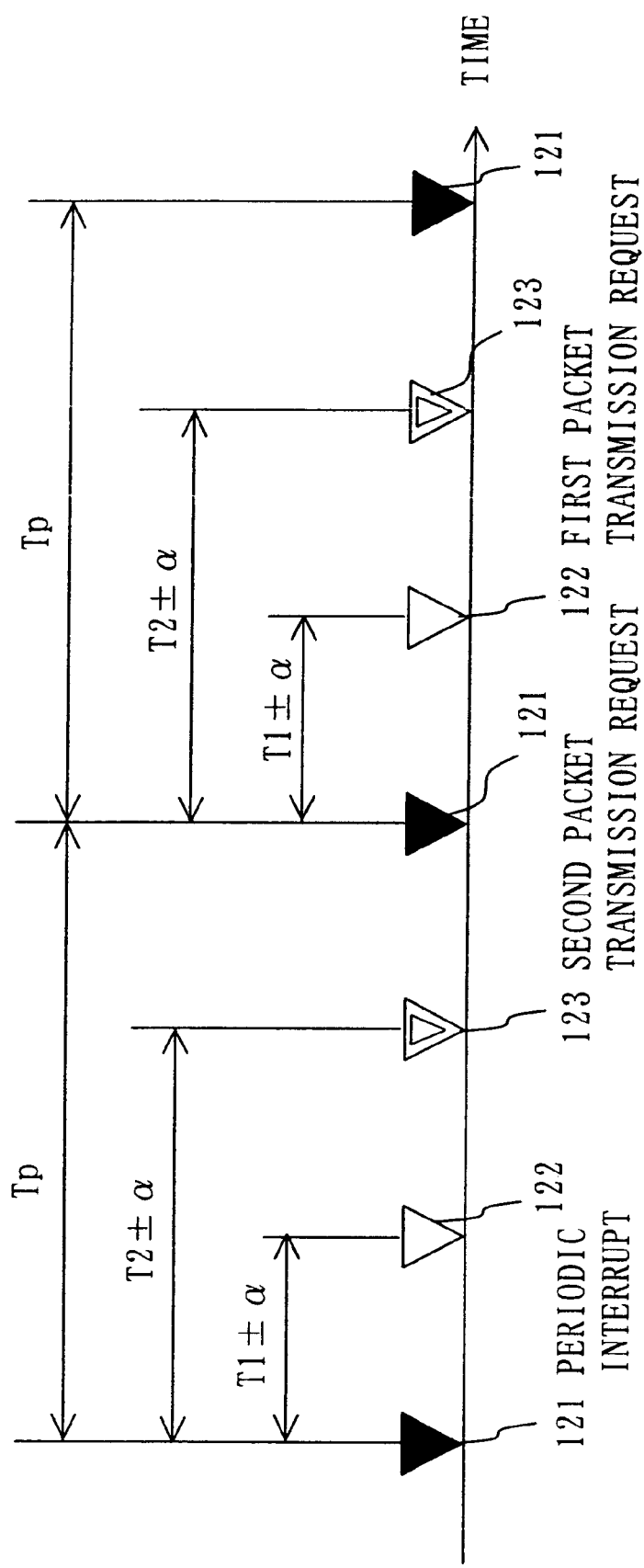
FIG. 9 shows system requests according to Embodiment 3 of the present invention.

FIG. 9 shows system requests. A periodic interrupt 121 indicates a time at which an interrupt from the periodic interrupt generating part 2 is generated. The periodic interrupt 121 occurs at intervals of the specific time Tp. A first packet transmission request 122 indicates a time at which the transmission requesting part 109 makes a request to the LAN controller 5 to transmit the first packet. A second packet transmission request 123 indicates a time at which the transmission requesting part 109 makes a request to the LAN controller 5 to transmit the second packet.

In this Embodiment 3, the control program 1 forms two packets at every periodic interrupt 121 and transmits the two packets. There exists a time limit that the transmission request 122 should be issued for the first packet within T1±α of the periodic interrupt 121. T1 stands for a requested process time period requested by the system. α stands for a tolerable time lag of the requested process time period T1.

There also exists a time limit that the transmission request 123 should be issued for the second packet within T2±α of the periodic interrupt 121. T2 stands for a requested process time period requested by the system. α stands for a tolerable time lag of the requested process time period T2.

The values of T1 and T2 can be optionally set by the user as long as all the following conditions are kept for T1 and T2. (The first packet requested time period 142 for processing)<(the second packet requested time period 143 for processing), each of the first packet requested time period 142 for processing and the second packet requested time period 143 for processing should be within the interval of the periodic interrupt 121, and the packet transmission process should not be generated before the packet forming.

Figure 10:
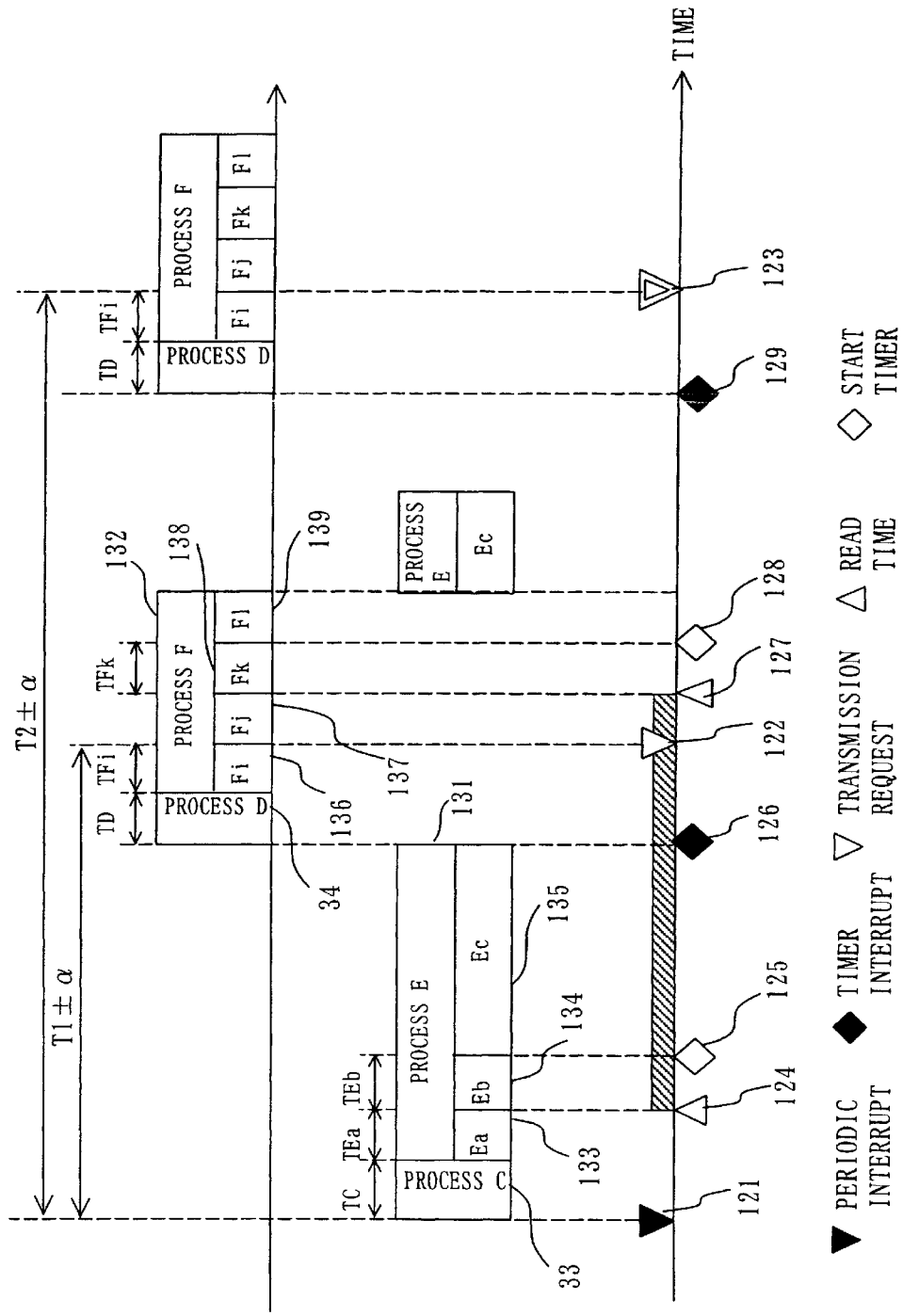
FIG. 10 shows processes from the periodic interrupt 121 to the second packet transmission request 123 of FIG. 9.

FIG. 10 shows processes from the periodic interrupt 121 to the second packet transmission request 123 of FIG. 9. A reference time read 124 indicates the time read from the absolute time timer 118. A first timer start 125 indicates the time when the timer starting part 116 starts the relative time timer 3 for the first packet transmission. A first timer interrupt 126 occurs after the time set in the relative time timer 3 for the first packet transmission (timer set value) has passed.

A current time read 127 indicates the time read from the absolute time timer 118. A second timer start 128 indicates the time when the timer starting part 116 starts the relative time timer 3 for the second packet transmission. A second timer interrupt 129 occurs after the time set in the relative time timer 3 for the second packet transmission (another timer set value) has passed.

A process E 131 indicates an interrupt handler responsive to the periodic interrupt 121 from the periodic interrupt generating part 2, that is the processes of the packet forming part 108 and the timer operating part 117. A process F 132 indicates an interrupt handler responsive to the first timer interrupt 126 and the second timer interrupt 129 from the relative time timer 3, that is the processes of the transmission requesting part 109 and the timer operating part 117.

The process E 131 is supposed to be divided into three at the reference time read 124 and at the first timer starting 125 regarding them as borders. A process Ea 133 in the process E 131 indicates the process from the first instruction of the packet forming part 108 to the reference time read 124. A process Eb 134 in the process E 131 indicates the process from the reference time read 124 to the first timer start 125. A process Ec 135 in the process E 131 indicates the process from the first timer start 125 to the last instruction of the packet forming part 108.

The process F 132 is supposed to be divided into four at the first packet transmission request 122, at the current time read 127, and at the second timer start 128 regarding them as borders. A process Fi 136 in the process F 132 indicates the process from the first instruction of the transmission requesting part 109 to first packet transmission request 122. A process Fj 137 in the process F 132 indicates the process from the first packet transmission request 122 to the current time read 127. A process Fk 138 in the process F 132 indicates the process from the current time read 127 to the second timer start 128. A process F1 139 in the process F 132 indicates the process from the second timer start 128 to the last instruction of the transmission requesting part 109.

The time period for each process is defined as follows: the time period necessary for the process Ea 133 is TEa (predicted time period of obtaining current time), the time period necessary for the process Eb 134 is TEb (predicted time period of setting the current time timer), the time period necessary for the process Fi 136 is TFi (predicted time period of transmission request), and the time period necessary for the process Fk 138 is TFk. (TEa+TEb corresponds to TAx, and TFi corresponds to TBi of FIG. 3 in Embodiment 1.) The process F 132 started by the first timer interrupt 126 performs the transmission process of the first packet and the process F 132 started by the second timer interrupt 129 performs the transmission process of the second packet.

In the transmission system of short time lag, the first packet transmission request 122 is issued by being responsive to the first timer interrupt 126 generated after a specific elapse time as a trigger, with using the relative time timer 3. This specific elapse time is calculated by subtracting TC+TEa+TEb+TD+TFi from the requested time period T1 for processing, meaning (Requested Time Period T1 for Processing)−(TC+TEa+TEb+TD+TFi), that is another timer set value.

According to the above, it is possible to issue the first packet transmission request 122 within (T1±α) of the periodic interrupt 121. In addition, it is guaranteed that the time period from the first timer start 125 to the first timer interrupt 126 is accurate by dint of the relative time timer 3 as stated in Embodiment 1. Therefore, factors of the time lag can be restricted to be the process Ea 133, the process Eb 134, the process Fi 136, the process C 33 or the process D34, meaning the process from the periodic interrupt 121 to the first timer start 125 or the process from the first timer interrupt 126 to the first packet transmission request 122. (The process Ea 133+the process Eb 134 corresponds to the process Ax 35 in FIG. 3 of Embodiment 1. The process Fi 136 corresponds to the process Bi 37 in FIG. 3 of Embodiment 1.) Accordingly, the time lag can be reduced as stated in Embodiment 1.

In the transmission system of short time lag, the second packet transmission request 123 is issued by being responsive to the second timer interrupt 129 generated after a specific elapse time as a trigger, with using the relative time timer 3, based on a time obtained from the absolute time timer 118 as a reference. This specific elapse time is calculated by subtracting (TC+TEa+TFk+TD+TFi) and (an elapse time from the reference time to the current time read by the current time read 127) from the requested time period T2 for processing, that is (the requested time period T2 for processing)−(TC+TEa+TFk+TD+TFi)−(the elapse time from the reference time to the current time read by the current time read 127).

According to the above, it is possible for the transmission requesting part 109 to issue the second packet transmission request 123 within (T2±α) of the periodic interrupt 121. In addition, it is guaranteed that the time period from the reference time read 124 to the current time read 127 is accurate because it is actually measured. Therefore, factors of the time lag can be restricted to be the process Ea 133, the process Fk 138, the process Fi 136, the process C 33 or the process D34, meaning the process from the periodic interrupt 121 to the reference time read 124, the process from the current time read 127 to the second timer start 128, or the process from the second timer interrupt 129 to the second packet transmission request 123. Accordingly, the time lag can be reduced.

In Embodiment 3, the first timer interrupt 126 and the second timer interrupt 129 are set to have higher priorities than the periodic interrupt 121. Therefore, even when the packet forming part 108 is being executed, if the first timer interrupt 126 or the second timer interrupt 129 is detected, the process of the transmission requesting part 109 is precedently executed with temporarily stopping the process of the packet forming part 108.

It is not necessarily needed for the first timer interrupt 126 to be generated during the execution of the process Ec 135. Namely, there is a possibility of the process E 131 being finished before the first timer interrupt 126 is generated.

Since the first timer interrupt 126 and the second timer interrupt 129 are set to have higher priorities than the periodic interrupt 121, the first packet can be transmitted within the limited time period even if the time period of forming two packets in the process E 131 is longer than the requested time period for processing the first packet transmission.

Figure 11:
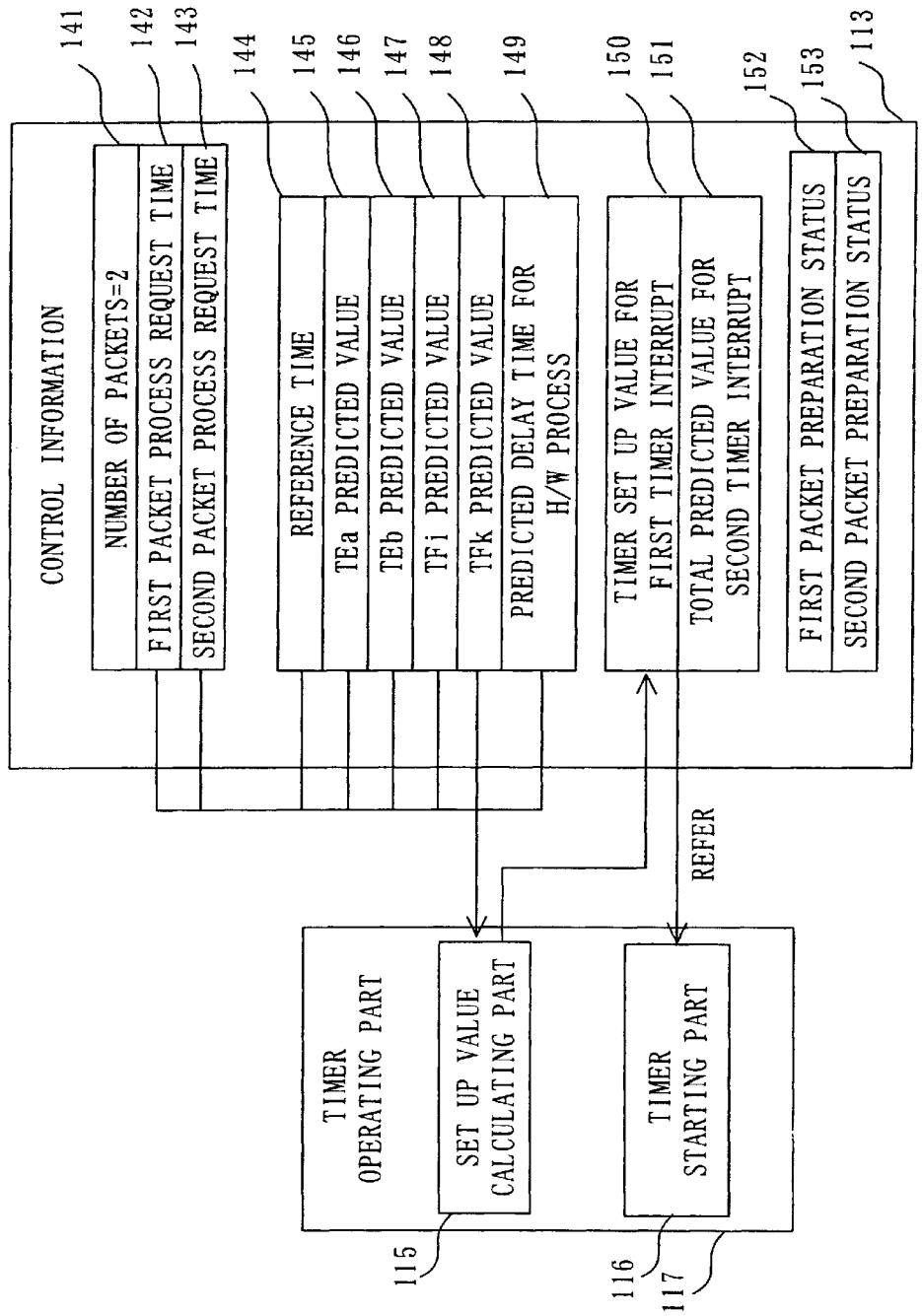
FIG. 11 shows processes performed between the timer operating part 117 and the control information 113 according to Embodiment 3 of the present invention.

FIG. 11 shows processes performed between the timer operating part 117 and the control information 113. Number of packets 141 indicates the number of packets to be transmitted to the LAN transmission line 4 at every periodic interrupt 121. A requested time period 142 for processing the first packet indicates the requested time period T1 for performing process from the periodic interrupt 121 to the first packet transmission request 122, requested by the system. A requested time period 143 for processing the second packet indicates the requested time period T2 for performing process from the periodic interrupt 121 to the second packet transmission request 123, requested by the system.

Relating to the requested time period 142 for processing the first packet and the requested time period 143 for processing the second packet, time information, packet number, and requested time period corresponding to each packet can be known. It is also acceptable to firstly memorize the requested time period 142 for processing the first packet and secondly the requested time period 143 for processing the second packet in order from the top.

A reference time 144 is a value read by the set value calculating part 115 or the packet forming part 108 from the absolute time timer 118 at the time of the reference time read 124 in the process E 131.

A TEa predicted value 145 indicates a predicted process time period (predicted time of obtaining current time) needed for the process Ea 133. A TEb predicted value 146 indicates a predicted process time period (predicted time of current time timer set) needed for the process Eb 134. A TFi predicted value 147 indicates a predicted process time period (predicted time for transmission request) needed for the process Fi 136. A TFk predicted value 148 indicates a predicted process time period (second-timer-set-predicted-time-period) needed for the process Fk 138. A predicted delay time period 149 of H/W process indicates a predicted process time period (the first process time period, the second process time period) of H/W process performed responsive to the interrupt. Each of the process time period TC needed for the process C 33 and the process time period TD needed for the process D 34 corresponds to the predicted delay time period 149 of H/W process. Namely, the same value is used for the process time periods TC and TD.

A timer set value 150 for the first timer interrupt, indicating a specific time period, is set in the relative time timer 3 based on the calculation of the requested time period 142 for processing the first packet (T1), the TEa predicted value 145, the TEb predicted value 146, TFi predicted value 147 and the predicted delay time period 149 of H/W process (TC, TD) calculated by the set value calculating part 115.

A total predicted value 151 for the second timer interrupt is the total of predicted process time period calculated by the set value calculating part 115 based on the calculation of the requested time period 143 for processing the second packet (T2), the TEa predicted value 145, the TFi predicted value 147, TFk predicted value 148 and the predicted delay time period 149 of H/W process. The total predicted value 151 for the second timer interrupt is not directly set in the relative time timer 3.

A first packet preparation status 152 shows whether the first packet to be transmitted to the LAN transmission line 4 exists or not. The first packet preparation status 152 is set at the time when the packet forming part 108 stores the first packet in the packet information 112. The first packet preparation status 152 is cleared at the time when the transmission requesting part 109 issues a transmission request to the LAN controller 5.

A second packet preparation status 153 shows whether the second packet to be transmitted to the LAN transmission line 4 exists or not. The second packet preparation status 153 is set at the time when the packet forming part 108 stores the second packet in the packet information 112. The second packet preparation status 153 is cleared at the time when the transmission requesting part 109 issues a transmission request to the LAN controller 5.

Figure 12:
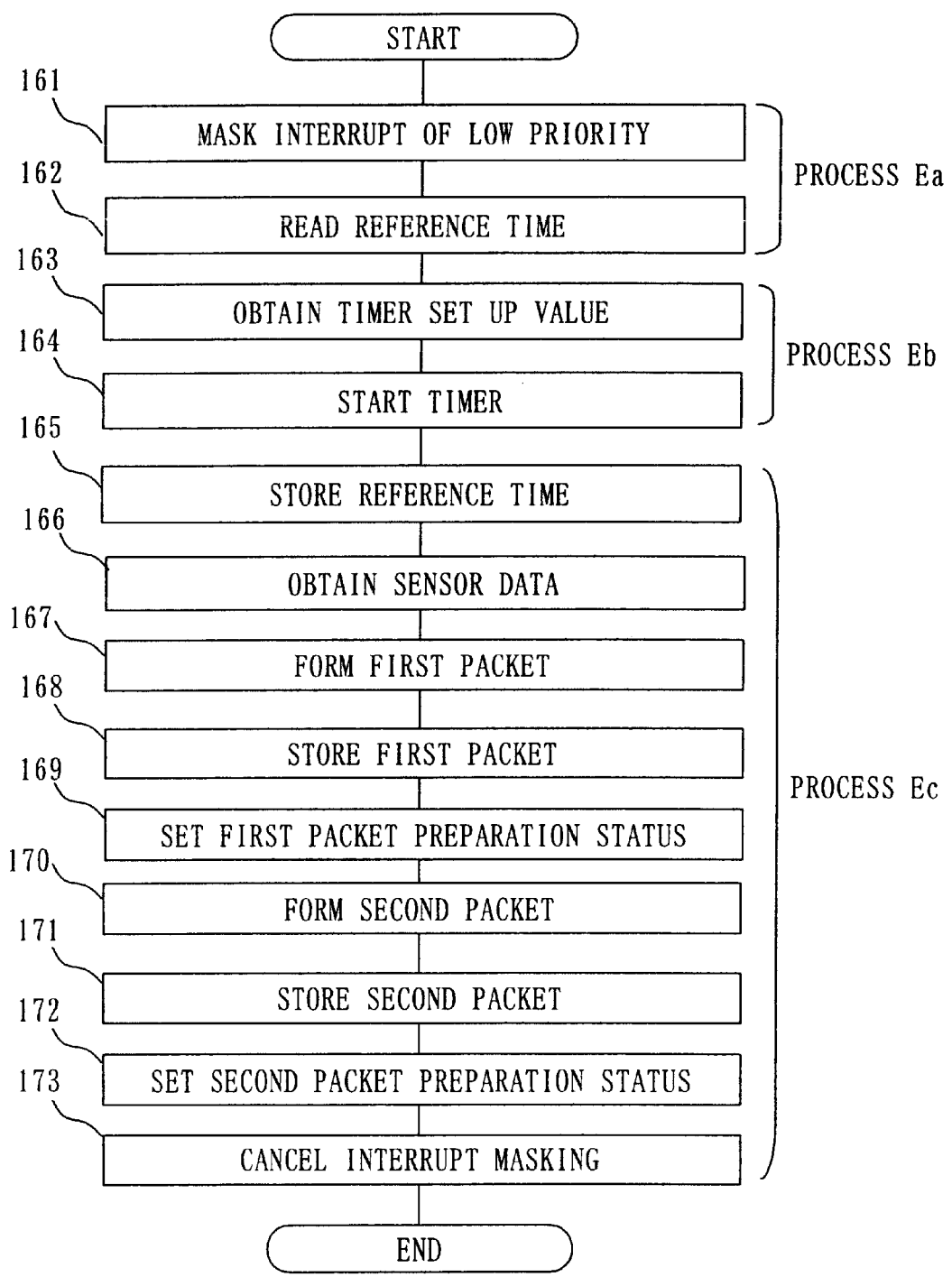
FIG. 12 shows a process flowchart of the process E 131 according to Embodiment 3 of the present invention.

FIG. 12 shows a process flowchart of the process E 131. The process E 131 is executed in the state that all the interrupts whose priorities are equal to or lower than that of the process E 131 are masked and no other interrupt handler is started even when an interrupt is detected by the interrupt detecting part 107.

Since the priority of the transmission requesting part 109 is higher than the packet forming part 108, the process F 132 is precedently executed when the first timer interrupt 126 or the second timer interrupt 129 is generated.

At a step 161, after the packet forming part 108 has been started based on the periodic interrupt 121, the interrupt detecting part 107 masks all the interrupts whose priorities are equal to or lower than that of the packet forming part 108. At a step 162, the set value calculating part 115 reads the current time from the absolute time timer 118 and defines it to be the reference time 144. It is also acceptable that the packet forming part 108 instead of the set value calculating part 115 reads the current time from the absolute time timer 118. The steps 161 and 162 correspond to the process Ea 133 of FIG. 10.

At a step 163, the timer starting part 116 obtains the timer set value 150 for the first timer interrupt. At a step 164, the timer starting part 116 sets the timer set value 150 for the first timer interrupt to the relative time timer 3 and starts the relative time timer 3. Otherwise, it is also acceptable that the packet forming part 108 instead of the timer starting part 116 performs the processes of the step 163 and the step 164. The steps 163 and 164 correspond to the process Eb 134 of FIG. 10.

At a step 165, the set value calculating part 115 records the reference time obtained at the step 162 to be the reference time 144 of the control information 113. It is also acceptable that the process of the step 165 is executed by the packet forming part 108.

At a step 166, the packet forming part 108 obtains sensor data to be output as a packet, from the sensor information 111. At a step 167, the packet forming part 108 forms the first packet based on the obtained sensor data. At a step 168, the packet forming part 108 stores the formed first packet in the packet information 112. At a step 169, the packet forming part 108 sets information indicating that the preparation of the first packet has been finished, in the first packet preparation status 152. At a step 170, the packet forming part 108 forms the second packet based on the obtained sensor data. At a step 171, the packet forming part 108 stores the formed second packet in the packet information 112. At a step 172, the packet forming part 108 sets information indicating that the preparation of the second packet has been finished, in the second packet preparation status 153. At a step 173, the interrupt detecting part 107 cancels the masking of the interrupt masked at the step 161, and resets the state of the interrupt handler to be ready for starting based on a detected interrupt. The steps 165 through 173 correspond to the process Ec 135 of FIG. 10.

The process Ea 133 or the process Eb 134 is composed of the minimum processes such as an operation for the register in the processor and an access to the timer set value 150 for the first timer interrupt stored in the memory area in which caching is not performed.

The state at this time is all the interrupts having priorities equal to or lower than that of the process Ea 133 or the process Eb 134 are prohibited. In addition, since the relative time timer 3 has not been started, the first timer interrupt 126 whose priority is higher than that of the process Ea 133 or the process Eb 134 does not occur. Therefore, a delay caused by other task interrupt is not generated.

Under the conditions stated above, the process time needed for the process Ea 133 or the process Eb 134 is predicted based on the number of instructions, access times to the memory, and so on. Each of the predicted process time of the process Ea 133 and Eb 134 is stored in the control information 113 in advance before the system starts, as the TEa predicted value 145 and the TEb predicted value 146.

Figure 13:
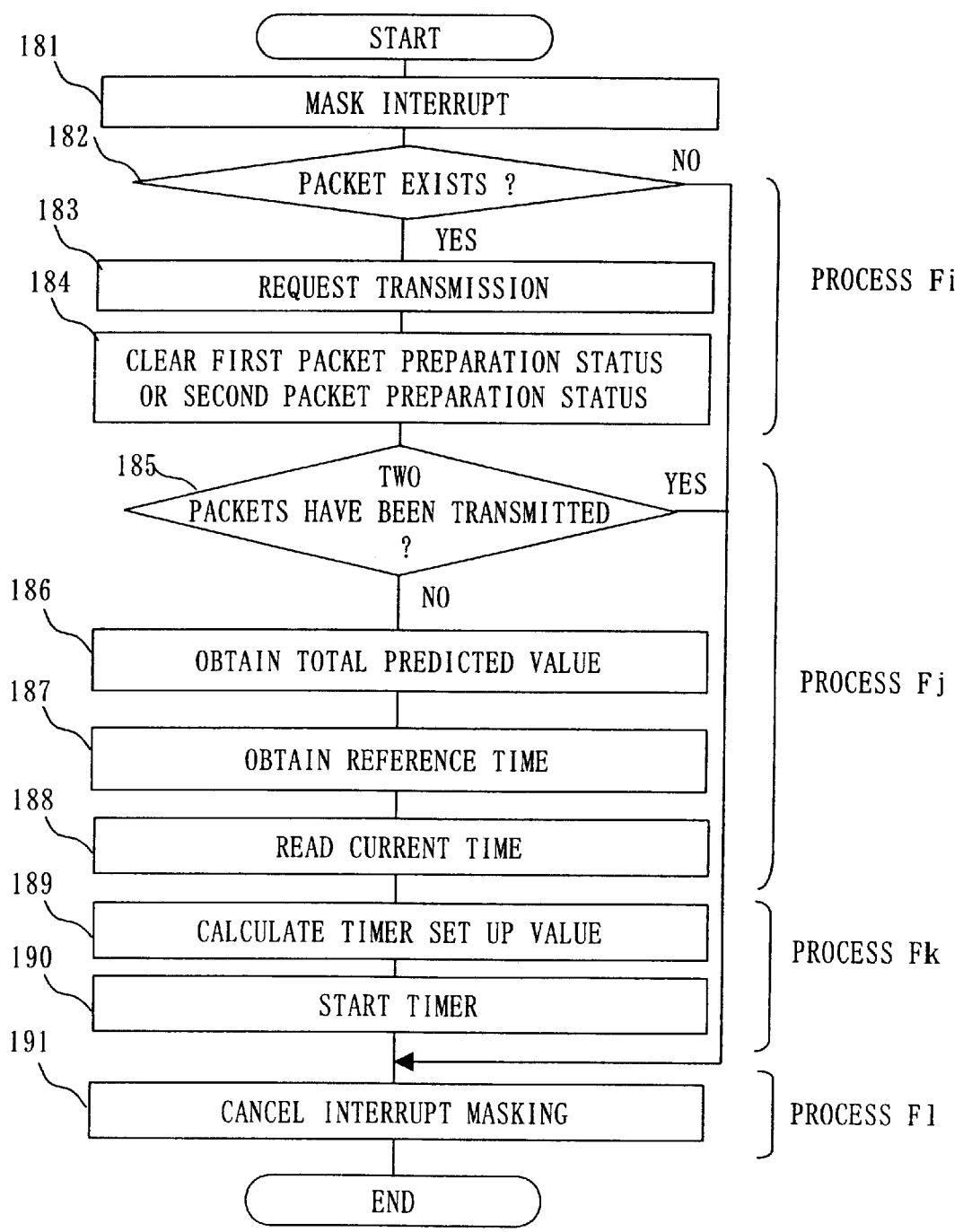
FIG. 13 shows a process flowchart of the process F 132 according to Embodiment 3 of the present invention.

FIG. 13 shows a process flowchart of the process F 132. The process F 132 is performed in the state all the interrupts are masked and no other interrupt handler is started even if an interrupt is detected by the interrupt detecting part 107.

At a step 181, after the transmission requesting part 109 has been started based on the first timer interrupt 126 and the second timer interrupts 129, the interrupt detecting part 107 masks all the interrupts.

At a step 182, the transmission requesting part 109 checks whether or not there is a packet to be output from the first packet preparation status 152 or the second packet preparation status 153 in the control information 113.

At a step 183, the transmission requesting part 109 designates a packet to be transmitted and requests the LAN controller 5 to transmit the designated packet.

At a step 184, the transmission requesting part 109 clears the first packet preparation status 152 or the second packet preparation status 153 corresponding to the requested packet to be transmitted at the step 183. The steps 181 through 184 correspond to the process Fi 136 of FIG. 10.

At a step 185, the transmission requesting part 109 checks whether the two packets have been already transmitted or not. If the transmission has not been finished, the processes of the steps 186 through 190 are executed.

At a step 186, the total predicted value 151 for the second timer interrupt is obtained from the control information 113, and at a step 187, the reference time 144 is obtained from the control information 113. At a step 188, the current time is read from the absolute time timer 118. The steps 185 through 188 correspond to the process Fj 137 of FIG. 10.

At a step 189, the set value calculating part 115 calculates a time (another timer set value) set in the relative time timer 3 based on the obtained total predicted value 151 for the second timer interrupt, reference time 144, and current time. At a step 190, the set value calculated by the set value calculating part 115 is set in the relative time timer 3 and the relative time timer 3 is started. It is also acceptable for the process of the step 189 or the step 190 to be performed by the transmission requesting part 109. The steps 189 and 190 correspond to the process Fk 138 of FIG. 10.

The process Fi 136 or the process Fk 138 as well as the process Ea 133 or the process Eb 134 is composed of the minimum processes such as an operation for the register in the processor and an access to the first packet preparation status 152 or the second packet preparation status 153 stored in the memory area in which caching is not performed. Since the state at this time is all the interrupts are prohibited, a delay caused by other task interrupt is not generated.

Under the conditions stated above, the process time period needed for the process Fi 136 or the process Fk 138 is predicted based on the number of instructions, access times to the memory, and so on. Each of the predicted process time period of the process Fi 136 and Fk 138 is stored in the control information 113 in advance before the system starts, as the TFi predicted value 147 and the TFk predicted value 148.

The respect different from Embodiment 1 is that the packet forming part 108 and the transmission requesting part 109 in Embodiment 3 have priorities. In the process Ea 133 or the process Eb 134, since the relative time timer 3 has not been started as stated above, the first timer interrupt 126 having a priority higher than that of the process Ea 133 or the process Eb 134 is not generated, and an interrupt having a priority equal to or lower than that of the process Ea 133 or the process Eb 134 is prohibited. Therefore, the process of the first packet transmission in Embodiment 3 is the same as Embodiment 1.

Concretely, in the process relating to the first packet, the set value calculating part 115 calculates a value set in the relative time timer 3 based on the control information 113, by calculating "(requested time period 142 for processing the first packet)−{(TEa predicted value 145+TEb predicted value 146+TFi predicted value 147)+(predicted delay time period 149 of H/W process)×2}.

As the TEa predicted value 145, the TEb predicted value 146, the TFi predicted value 147 and the predicted delay time period 149 of H/W process are fixed values, the values 145, 146, 147 and 149 are calculated only once at the system initialization and stored as the timer set value 150 for the first timer interrupt.

It is enough for the timer starting part 116 or the packet forming part 108 to refer to only the timer set value 150 for the first timer interrupt. Therefore, the calculation time for obtaining the values 145, 146, 147 and 149 at every necessary occasion can be saved. In addition, since the timer set value 150 for the first timer interrupt is stored in the memory area where the caching is not performed, it is easy to predict the process time period of the process Eb.

Relating to the second packet, it is not taken into consideration in Embodiment 1. As the timer set value for the second timer interrupt is the time period from the second timer start 128 to the second timer interrupt 129, it is necessary to set a value calculated by subtracting the delay time period of the H/W process, the delay time period of the S/W process, and the elapse time since the reference time from the requested time period 143 for processing the second packet, to the relative time timer 3.

First, a value is calculated by subtracting the predicted delay time period of the H/W process and the S/W process from the requested time period 143 for processing the second packet. The set value calculating part 115 obtains the total predicted value 151 for the second timer interrupt based on the control information 113 by calculating "(requested time period 143 for processing the second packet (T2))−{(TEa predicted value 145)+(TFi predicted value 147)+(TFk predicted value 148)+(predicted delay time period 149 of H/W process)×2}.

Since the timer set value for the second timer interrupt includes the delay time period of the H/W process and the S/W process, it is possible to start the transmission requesting part 109 within the limited time period. It is also possible to reduce the time lag in the time period from the periodic interrupt 121 to the second packet transmission request 123.

As the TEa predicted value 145, the TFi predicted value 147, the TFk predicted value 148 and the predicted delay time period 149 of H/W process are fixed values, the values 145, 147, 148 and 149 calculated at the system initialization are stored as the total predicted value 151 for the second timer interrupt.

In FIG. 11, the total predicted value 151 for the second timer interrupt is stored in the memory area in which caching is not performed. Namely, the total predicted value 151 for the second timer interrupt is not to be in the cache memory even when it is accessed.

As the other parameters in the control information 113, meaning the requested time period 143 for processing the second packet, the TEa predicted value 145, the TFi predicted value 147, the TFk predicted value 148 and the predicted delay time period 149 of H/W process are used only for calculating the total predicted value 151 for the second timer interrupt at the system initialization, they can be allocated anywhere in the memory.

Since the total predicted value 151 for the second timer interrupt and the second packet preparation status 153 are stored in the memory area in which caching is not performed, it is easy to predict the process time period of the process Fi 136. Then, as the process time period is easily predicted, it can be expected to reduce the time lag.

It is necessary for the second packet transmission request 123 as well as the first packet transmission request 122 to regard the periodic interrupt 121 as the reference. However, as the relative time timer 3 has been operated until the first timer interrupt 126 is generated, it is impossible to used the relative time timer 3.

Though it is possible to regard the first timer interrupt 126 as the reference, comparing with the periodic interrupt 121, the first timer interrupt 126 may have the time lag of {(TEa predicted value 145)+(TEb predicted value 146)+(TFi predicted value 147)+(predicted delay time period 149 of H/W process)×2}, which may lower the system accuracy.

Then, in the process E 131, a time is read from the absolute time timer 118 at the generation of the periodic interrupt 121 (step 162), and the read time is stored in the control information 113 as the reference time 144 (step 165). This reference time 144 is used for calculating the generation time of the second timer interrupt 129.

Since the reference time 144 is stored at the process Ec 135 (step 165 in FIG. 12) and read at the process Fj (step 187 in FIG. 13), the reference time 144 is not included in the process time predicted value calculated in advance. Therefore, it is acceptable to allocate the reference time 144 anywhere in the memory.

By dint of setting the reference time 144 as the reference at the time of calculating the generation time of the second timer interrupt 129, the accuracy of the second timer interrupt generation time can be enhanced.

The transmission requesting part 109 started by the first timer interrupt 126 makes the relative time timer 3 start after the first packet transmission request 122, in order to generate the second timer interrupt 129. At this time, the value set in the relative time timer 3 is calculated by subtracting an elapse time since the reference time 144, from the total predicted value 151 for the second timer interrupt.

Namely, in the transmission system of short time lag according to the present Embodiment, the timer set value for the second timer interrupt is obtained, with using the relative time timer 3, by calculating "(requested time period 143 for processing the second packet (T2))−{(TEa predicted value 145)+(TFi predicted value 147)+(TFk predicted value 148)+(predicted delay time period 149 of H/W process)×2} (total predicted value 151 for the second timer interrupt)−{(current time)−(reference time 144)} (the part expressed in slanted lines in FIG. 10)". Then, the relative time timer 3 is started by using this calculated value.

As stated above, the timer set value for the second timer interrupt includes the delay time period for the H/W process and the S/W process, it is possible to issue the second packet transmission request 123 within the limited time period. Therefore, the time lag of the time period from the periodic interrupt 121 to the second packet transmission request 123 can be reduced.

Embodiment 4

In Embodiment 3, an example of the transmission system has been explained in which the packet forming part 108 forms two packets, the transmission requesting part 109 is started twice in one period, and the transmission requesting part 109 requests one packet to be transmitted at each starting.

In this Embodiment 4, an example of the transmission system will be explained in which the packet forming part 108 forms n, being more than two, packets (n>2), the transmission requesting part 109 is started n times in one period, and the transmission requesting part 109 requests one packet to be transmitted at each starting.

Figure 14:
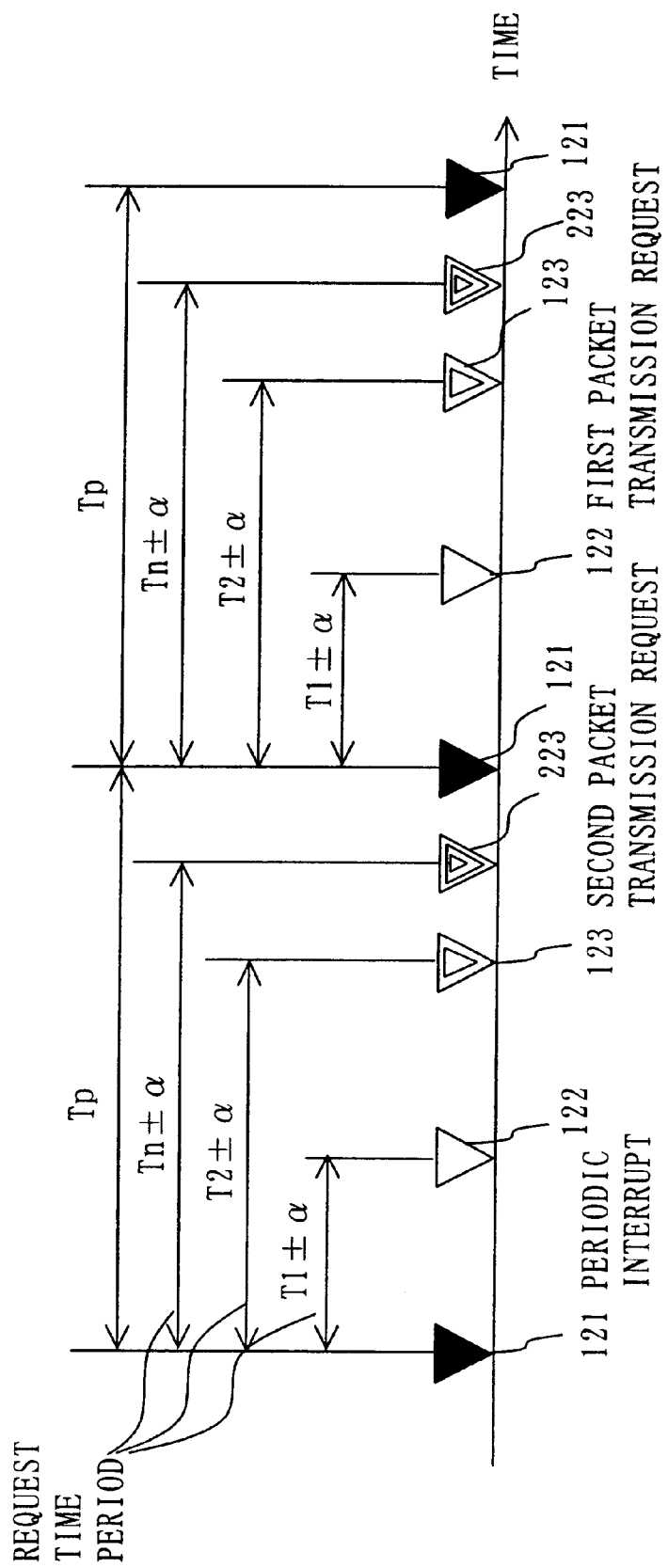
FIG. 14 shows system requests according to Embodiment 4 of the present invention.

FIG. 14 shows system requests according to Embodiment 4. The system configuration elements of Embodiment 4 are the same as those shown in FIG. 8 of Embodiment 3. In FIG. 14, the requests having the same reference signs as FIG. 9 indicate the same requests.

A nth packet transmission request 223 indicates the time when the transmission requesting part 109 requests the LAN controller 5 to transmit the nth packet. In Embodiment 4, the packet forming part 108 forms n packets at one starting, and the transmission requesting part 109 requests to transmit the n packets formed by the packet forming part 108 during one period (Tp) from the period interrupt 121 to the next periodic interrupt.

The first packet and the second packet should be requested to be transmitted within the same limited time period as Embodiment 3. It is supposed there to be a time limit that the transmission request 223 should be issued for the nth packet within Tn±α of the periodic interrupt 121. Tn stands for a requested process time period requested by the system. α stands for a tolerable time lag of the requested process time period Tn. The values of T1, T2 and Tn can be optionally set by the user.

Figure 15:
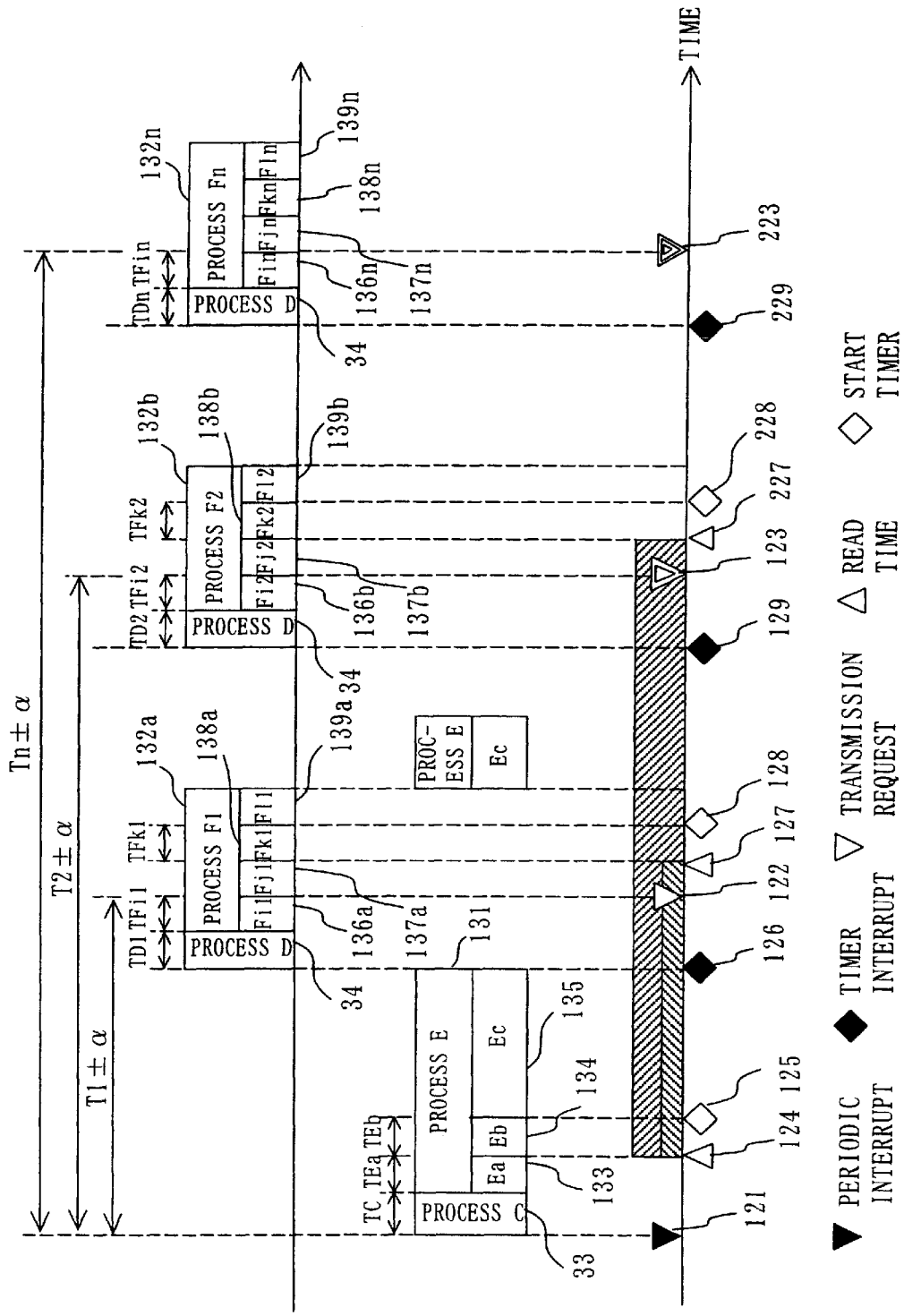
FIG. 15 shows processes from the periodic interrupt 121 to the nth packet transmission request 223 of FIG. 14.

FIG. 15 shows processes from the periodic interrupt 121 to the nth packet transmission request 223 in FIG. 14. The different respect between FIG. 15 and FIG. 10 is the process of transmission requesting part 109. In FIG. 15, n processes by the transmission requesting part 109 are performed. The processes F1 132a, F2 132b and Fn 132n respectively corresponds to the process F 132 of FIG. 10. In FIG. 15, as n packets are formed at the process E 131, the transmission request processes for the formed packets, that is the first packet through the nth packet, are performed at the processes F1 132a through Fn 132n.

Figure 16:
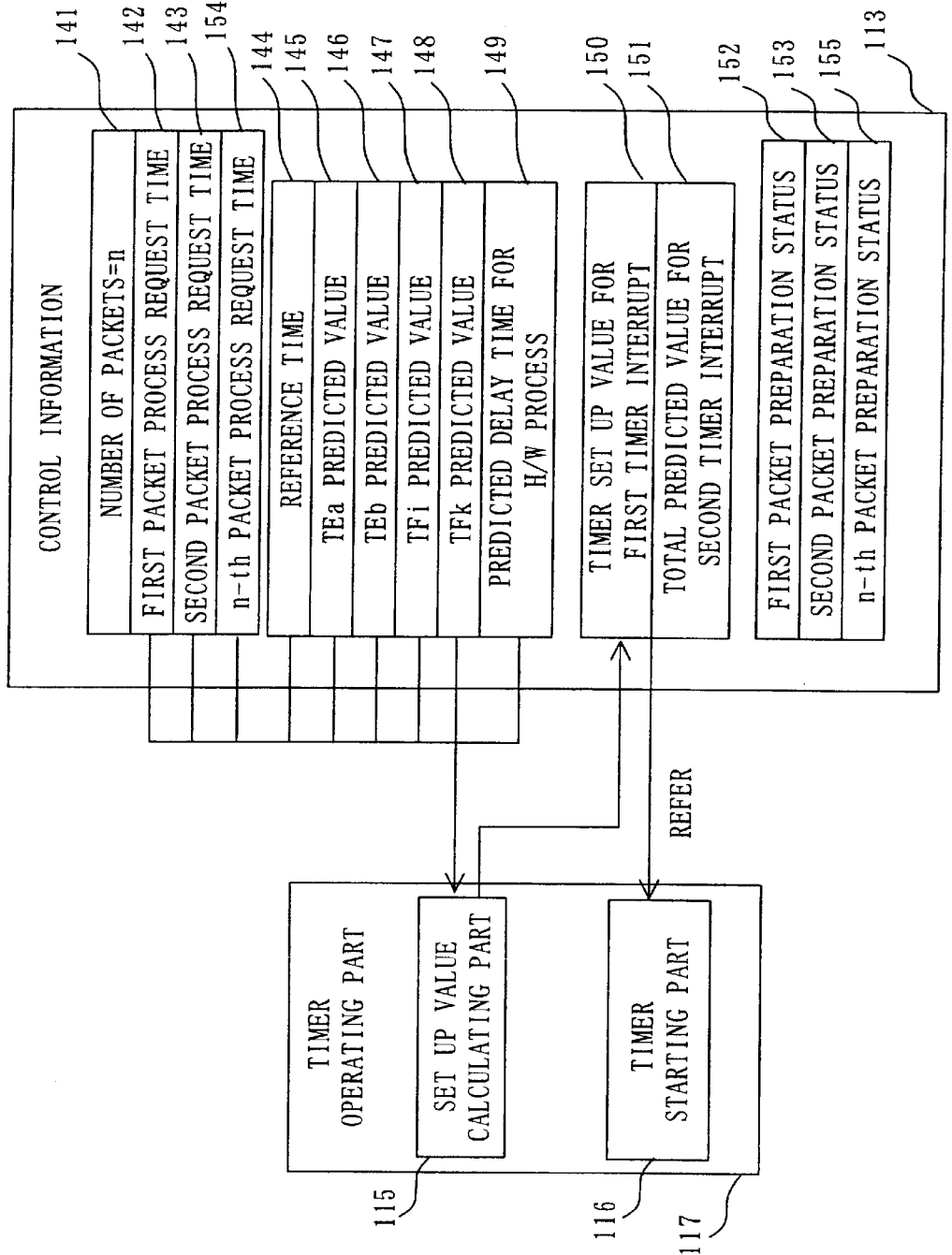
FIG. 16 shows processes performed between the timer operating part 117 and the control information 113 according to Embodiment 4 of the present invention.

FIG. 16 shows processes performed between the timer operating part 117 and the control information 113. The different respect in FIG. 16 from FIG. 11 is that a requested time period 154 for processing the nth packet and a nth packet preparation status 155 are added. Other respects are the same as FIG. 11.

Figure 17:
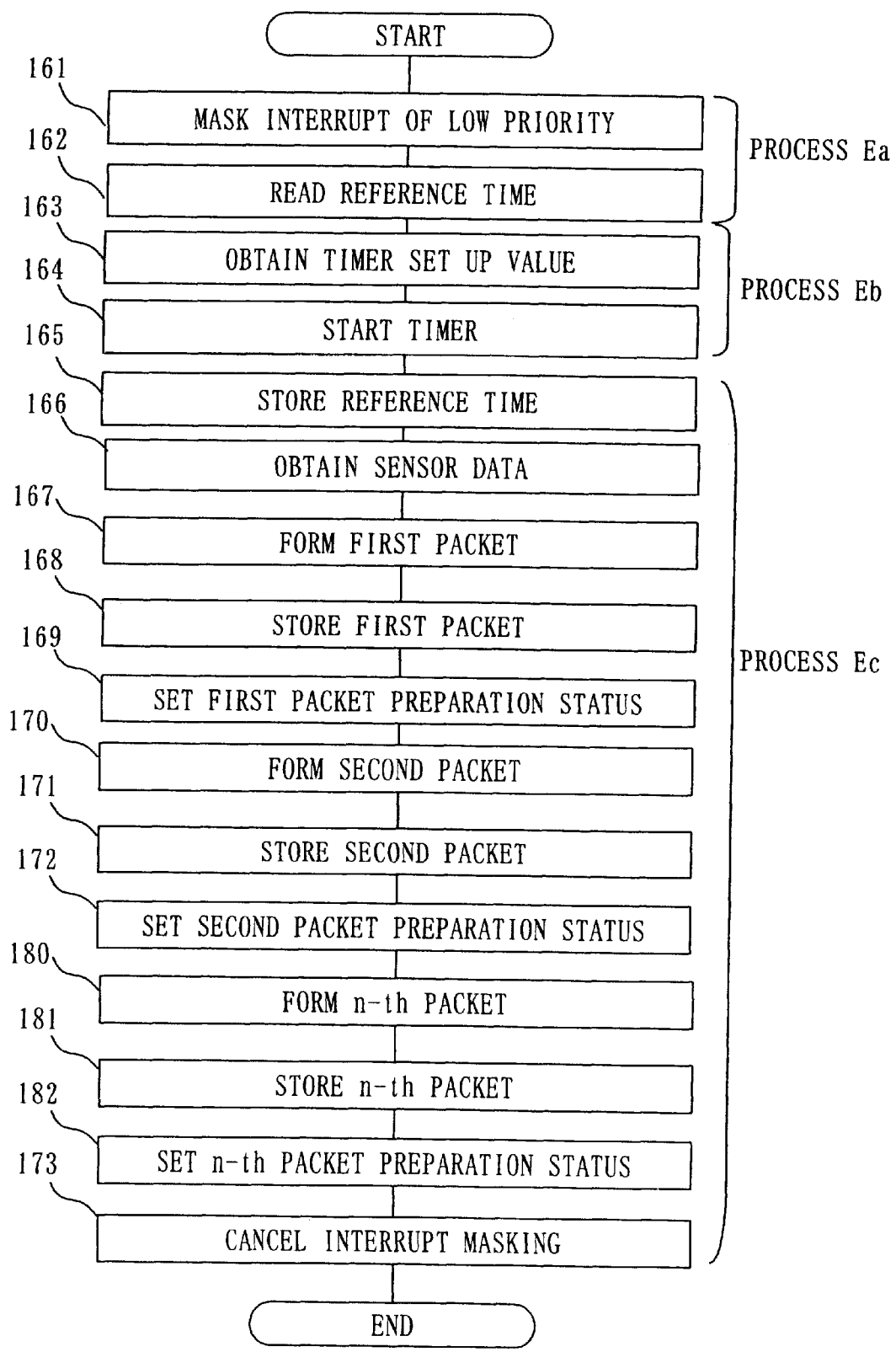
FIG. 17 shows a process flowchart of the process E 131 according to Embodiment 4 of the present invention.

FIG. 17 shows a process flowchart of the process E 131. The different respect in FIG. 17 from FIG. 12 is that steps 180 through 182 for the processes regarding the nth packet are added after the step 172. The nth packet is formed at the step 180, the nth packet is stored at the step 181, and the nth packet preparation status is set at the step 182. Namely, the processes relating to the nth packet are performed at the steps 180 through 182. For instance, in the case of forming 10 packets, the processes concerning to the third packet through the tenth packet are performed by repeating the steps 180 through 182.

Figure 18:
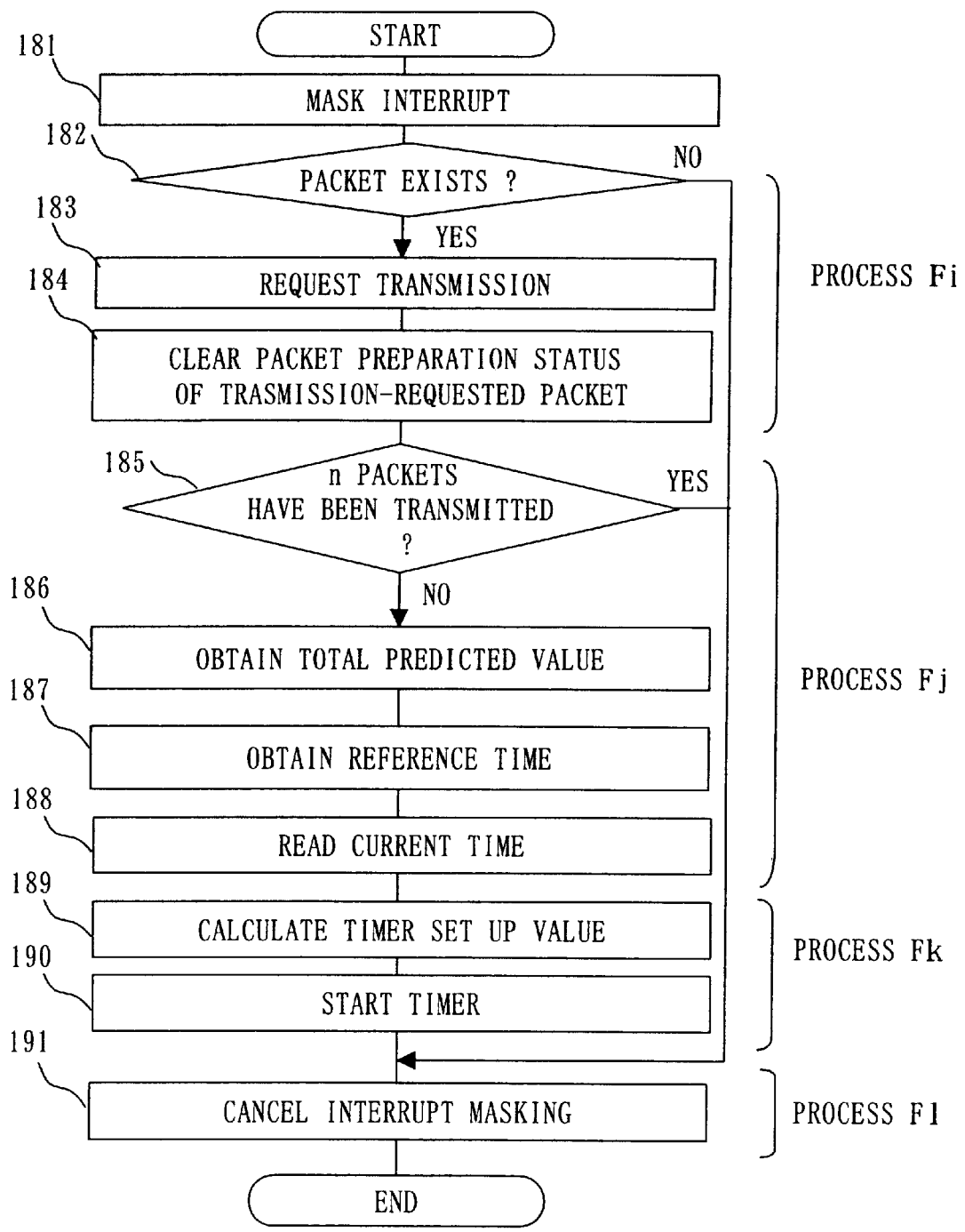
FIG. 18 shows a process flowchart of the process F1 132a according to Embodiment 4 of the present invention.
Figure 19:
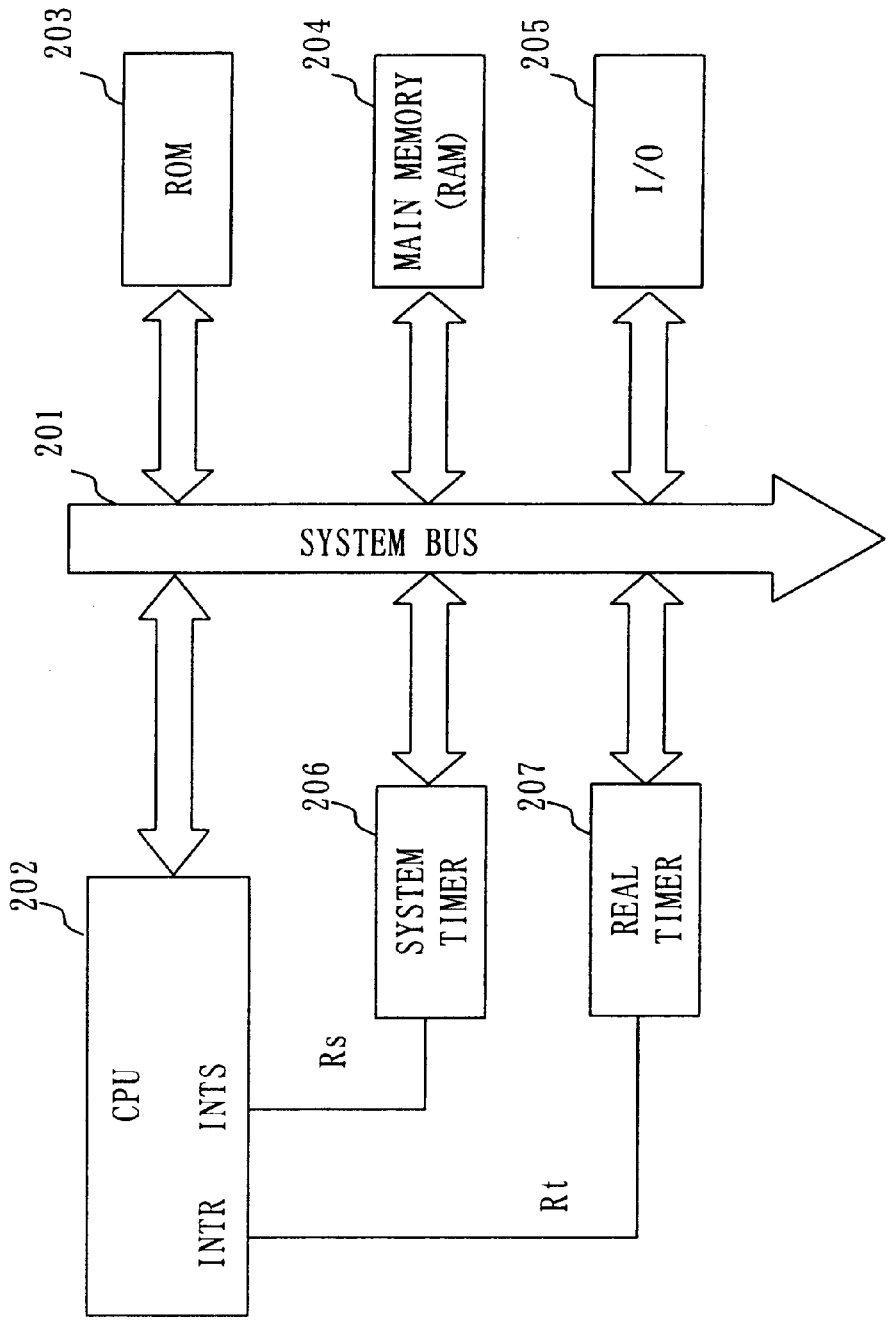
FIG. 19 shows a configuration of a task wait time controller of a conventional computer system.
Figure 20:
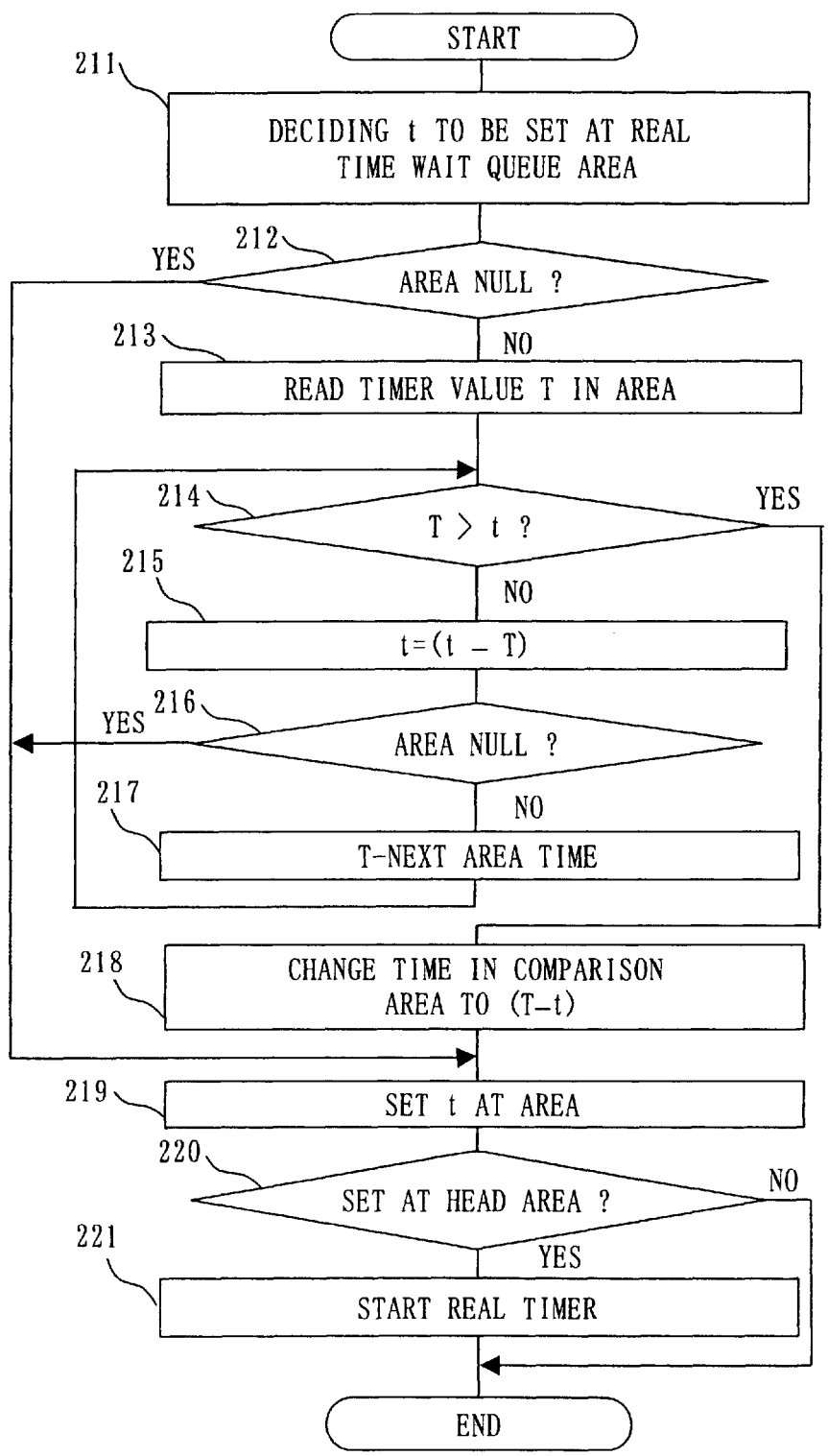
FIG. 20 shows a flowchart of a conventional real timer wait queue setting process.

FIG. 18 shows a process flowchart of the process F1 132a (F2 132b, or Fn 132n). Since all the process contents of the process F1 132a, F2 132b, and Fn 132n are the same, the process F1 132a, as a representative, is explained with reference to FIG. 18. The flowchart of FIG. 18 is similar to FIG. 13 of Embodiment 3. The different respect in FIG. 18 from FIG. 13 is that whether or not the n packets have been transmitted is judged at the step 185. By judging whether the n packets have been transmitted or not at the step 185, if the n packets have not been transmitted, the n packets can be transmitted through the processes from the step 186 to the step 190.

The timing of starting the relative time timer 3 for requesting the packets from the second to the nth to be transmitted is obtained by the calculation for the timer set value at the step 189, based on an elapse time from the reference time 144 to the current time obtained from the absolute time timer 118 at the step 188 of FIG. 8. Thus, the time set in the relative time timer 3 is calculated. For instance, in the case of the second packet being transmitted, the elapse time from the reference time read 124 to the current time read 127 of FIG. 15 is used. In the case of the third packet being transmitted, the elapse time from the reference time read 124 to the current time read 227 of FIG. 15 is used. Namely, when the nth packet is transmitted, the elapse time from the reference time read 124 to the current time read used in the process for transmitting (nth−1) packet of FIG. 15 is used. In the calculation of timer set value at the step 189, the requested process time period corresponding to the next packet to be requested and transmitted is obtained from the control information 113.

Namely, in the case of n packets being formed and requested to be transmitted, since the timer set value for the nth timer interrupt includes the delay time period of the H/W process and the S/W process, the nth packet transmission request 223 can be issued within the limited time period. Besides, it is possible to reduce the time lag of the time period from the periodic interrupt 121 to the nth packet transmission request 223.

As stated above, examples of the transmission system of short time lag according to the present invention have been explained in Embodiment 1 through 4. In one example of the transmission system, the followings have been described: the periodic interrupt generating part which generates a periodic interrupt, the relative time timer by which a timer interrupt is generated after a specified time period has passed, the interrupt detecting part which detects the periodic interrupt or the timer interrupt and starts a process task corresponding to the interrupt based on the interrupt vector table showing relations between interrupts and process tasks to be started responsive to the interrupts, the packet forming part which forms a packet by being started responsive to the periodic interrupt, the transmission requesting part which requests the LAN controller to transmit the packet by being started responsive to the timer interrupt, the sensor information which stores sensor data to be transmitted as the packet, the packet information which stores the packet, the control information which includes data related to the number of packets to be transmitted at every periodic interrupt, the requested time period, and the predicted delay time period, the set value calculating part which predicts and calculates a value set in the relative time timer, and the timer starting part which starts the relative time timer.

In one example of the transmission system, the transmission system of short time lag has been explained in which the process time period from the periodic interrupt to the timer start and the process time period from the timer interrupt to the packet transmission request are predicted based on the periodic interrupt as a trigger in order to decide a generation time of the timer interrupt for starting the transmission requesting part.

In one example of the transmission system, the transmission system of short time lag has been explained in which a middle value between the predicted maximum value and the predicted minimum value is used as the delay time period of H/W process at the time period from the interrupt generation to the interrupt handler start for the periodic interrupt or the timer interrupt.

In one example of the transmission system, the transmission system of short time lag has been explained in which the packet forming part is executed in the state that all the interrupts are prohibited, and composed of the configuration where the process time period from the process beginning to the timer start is easily predicted. Namely, the process time period from the first instruction of the packet forming part to the timer start is predicted and stored as control information in advance.

In one example of the transmission system, the transmission system of short time lag has been explained in which the transmission requesting part is executed in the state that all the interrupts are prohibited, and composed of the configuration where the process time period from the process beginning to the packet transmission request is easily predicted. Namely, the process time period from the first instruction of the transmission requesting part to the packet transmission request is predicted and stored as control information in advance.

In one example of the transmission system, the transmission system of short time lag has been explained in which the set value calculating part calculates a relative time for generating a timer interrupt, based on a requested time period stored in the control information, a predicted process time period from the first instruction of the packet forming part started by the periodic interrupt to the timer start, a predicted process time period from the first instruction of the transmission requesting part started by the timer interrupt to the packet transmission request, and a predicted delay time period of H/W process responsive to the interrupt.

In one example of the transmission system, the transmission system of short time lag has been explained in which the set value calculating part calculates a timer set value at the system initialization and stores the timer set value in the memory area where caching is not performed, in the control information.

In one example of the transmission system, the transmission system of short time lag has been explained in which the packet forming part reads a timer set value from the memory area where caching is not performed in the control information responsive to a periodic interrupt as a trigger and the relative time timer is started based on the timer set value.

In one example of the transmission system, the transmission system of short time lag has been explained in which the set value calculating part calculates a timer set value at the system initialization and stores the timer set value in the global register of the processor.

In one example of the transmission system of short time lag explained as a transmission system, the followings have been described: the periodic interrupt generating part which generates a periodic interrupt, the relative time timer by which a timer interrupt is generated after a specified time period has passed, the absolute time timer which controls a time, the interrupt detecting part which detects the periodic interrupt or the timer interrupt and starts a process task corresponding to the interrupt based on the interrupt vector table showing relations between interrupts and process tasks to be started responsive to the interrupts, and priorities, the packet forming part which forms two packets by being started responsive to the periodic interrupt, the transmission requesting part which requests the LAN controller to transmit the packet by being started responsive to the timer interrupt, the sensor information which stores sensor data to be transmitted as the packet, the packet information which stores the packet, the control information which includes data related to the number of packets to be transmitted at every periodic interrupt, the requested time period, and the predicted delay time period, the set value calculating part which predicts and calculates a value set in the relative time timer, and the timer starting part which starts the relative time timer.

In one example of the transmission system, the transmission system of short time lag has been explained in which the process time period from the periodic interrupt to the first timer start and the process time period from the first timer interrupt to the first packet transmission request are predicted based on the periodic interrupt as a trigger in order to decide a generation time of the first timer interrupt for starting the transmission requesting part which transmits the first packet, and the process time period from the periodic interrupt to the reference time read, the process time period from the current time read to the second timer start, and the process time period from the second timer interrupt to the second packet transmission request are predicted based on the first timer interrupt as a trigger, in order to decide a generation time of the second timer interrupt for starting the transmission requesting part which transmits the second packet, by calculating the elapse time since the reference time.

In one example of the transmission system, the transmission system of short time lag has been explained in which the transmission requesting part has a priority higher than that of the packet forming part, and when the first timer interrupt is detected, the transmission request of the first packet is precedently issued even if the packet forming part is just forming the second packet.

In one example of the transmission system, the transmission system of short time lag has been explained in which the set value calculating part calculates a total predicted value for the second timer interrupt based on a second packet requested time period stored in the control information, a predicted process time period from the first instruction of the packet forming part started by the periodic interrupt to the reference time read, a predicted process time period from the current time read to the second timer start, a predicted process time period from the first instruction of the transmission requesting part started by the second timer interrupt to the second packet transmission request, and a predicted delay time period of H/W process responsive to the interrupt.

In one example of the transmission system, the transmission system of short time lag has been explained in which the set value calculating part calculates a total predicted value for the second timer interrupt at the system initialization, and stores the calculated total predicted value for the second timer interrupt in the memory area where caching is not performed, in the control information.

In one example of the transmission system, the transmission system of short time lag has been explained in which the packet forming part reads a time from the absolute time timer to be the reference time for calculating a generation time of the second timer interrupt which is to be a trigger for transmitting the second packet, and stores the read time.

In one example of the transmission system, the transmission system of short time lag has been explained where the transmission requesting part, which is started by the first timer interrupt, reads the reference time and the total predicted value for the second timer interrupt from the control information, and the current time from the absolute time timer, calculates a relative time period up to the second timer interrupt being generated, and starts the relative time timer based on the relative time period.

According to the examples of the transmission system of the present invention described in Embodiment 1 through 4, it is possible for the transmission requesting part to issue the transmission request within the limited time period (T±α) of the periodic interrupt by the periodic interrupt generating part, by dint of generating an interrupt by the relative time timer based on a specified timer set value calculated by the set value calculating part. Since it is guaranteed that the specified timer set value can be measured as an accurate time by the relative time timer at the time period from the timer starting by the relative time timer to the timer interrupt, a factor of the time lag is restricted to be the process performed at the time period from the periodic interrupt to the timer starting or the time period from the timer interrupt to the transmission request. Accordingly, there is an effect that the time lag can be lessened. Besides, as other processes can be performed at the time period from the finish of the packet forming part processing to the beginning of the transmission requesting part processing, it is possible to effectively perform the processes.

Regarding the relative time timer starting and the transmission starting, the predicted time of them are stored in the control information memorizing part as the time information. The predicted time of the relative time timer starting and the predicted time of the transmission starting are used when a specified timer set value is calculated by the set value calculating part. Therefore, there is an effect that the timing of the relative time timer starting and a specified time period measured by the relative time timer can be easily calculated to be time close the real time.

A middle value between the minimum time value and the maximum time value regarding the first process time period included in the above relative-time-timer-starting-predicted-time-period and a middle value regarding the second process time period included in the above transmission-starting-predicted-time-period are stored in the time information as predicted delay time periods. The process time periods of the first process and the second process indicate process time periods performed by the H/W before the process of the packet forming part or the transmission requesting part is actually started. By dint of memorizing the process time periods by the H/W, included in the relative-time-timer-starting-predicted-time-period and the transmission-starting-predicted-time-period, in the control information memorizing part as predicted delay time periods, a specified timer set value calculated by the set value calculating part can be close to the real time, which further reduces the process time lag.

The relative-time-timer-starting-predicted-time-period is divided into two of the predicted delay time period and the timer-set-predicted-time-period from the actual process starting of the packet forming part to the timer set value being set in the relative time timer, and the divided time periods are memorized in the control information memorizing part in advance. Therefore, the relative-time-timer-starting-predicted-time-period used for calculating a specified timer set value calculated by the set value calculating part can be close to the real process time period. Then, the calculated specified timer set value is to be the set value meeting the actual process, which effectively reduces the time lag.

The transmission-starting-predicted-time-period is divided into two of the predicted delay time period and the transmission-request-predicted-time-period from the actual process starting of the transmission requesting part to the packet transmission request, and the divided time periods are memorized in the control information memorizing part in advance. Therefore, the transmission-request-predicted-time-period used for calculating a specified timer set value calculated by the set value calculating part can be close to the real process time period. Then, the calculated specified timer set value is to be the set value meeting the actual process, which effectively reduces the time lag.

The set value calculating part calculates the specified timer set value by using the requested time period for processing, the timer-set-predicted-time-period, the transmission-request-predicted-time-period and the predicted delay time period stored in the control information memorizing part. Therefore, the calculated specified timer set value is to be a value close to the real process time, which effectively reduces the time lag.

The packet forming part forms one packet at one starting, and the transmission requesting part transmits one packet at one starting. Then, the starting time of the transmission requesting part in one period is once, and the number of kinds of the specified timer set value calculated by the set value calculating part is one. The transmission requesting part is started by using the calculated timer set value, and the formed one packet is certainly requested to be transmitted in the requested time period for processing.

The timer set value is memorized in the memory area where the caching is not performed. Therefore, an access to the timer set value can be performed at a fixed process speed, and the timer-set-predicted-time-period can be easily predicted.

The control information memorizing part includes a global register of the processor for storing the timer set value. As the global register can be used in common by the packet forming part and the transmission requesting part, it is not necessary to save the data in the global register even when the task is switched, which effectively leads to the high speed process.

The packet forming part forms packets equal to or more than two, and the transmission requesting part transmits one packet formed by the packet forming part at one starting. Therefore, the times of the transmission requesting part starting is equal to the number of the packets. The transmission requesting part calculates another timer set value different from the specified timer set value. This calculated timer set value is set in the relative time timer. Accordingly, it is possible to build the transmission system configuration where packets equal to or more than two are formed and transmitted.

The second-timer-set-predicted-time-period used for calculating the another timer set value is stored in the control information memorizing part as the time information. The predicted time periods of the current time obtaining and the current time timer setting are memorized in the control information memorizing part as the time information. The requested time period for processing is stored in the control information memorizing part to be corresponding to packets formed by the packet forming part. The transmission requesting part calculates another timer set value by using the current time obtained from the current time timer, the reference time, the second-timer-set-predicted-time-period, the current-time-obtaining-predicted-time-period, and the transmission-request-predicted-time-period stored in the control information memorizing part, the predicted delay time period and the requested time period for processing corresponding to the next packet number to be transmitted. Therefore, since the another timer set value is calculated by using the process time periods predicted in advance, the another set value can be a value close to the actual process time period, which effectively reduces the time lag. Then, each of the formed packets is certainly requested to be transmitted within each requested time period for processing.

The process of the transmission requesting part has a priority higher than that of the packet forming part, and so even if an interrupt by the relative time timer is generated while the second packet or the packet after the second is just being formed by the packet forming part, the transmission requesting part is started in order to precedently execute the process of the transmission requesting part. Therefore, the packet whose transmission preparation has been finished can be requested to be transmitted through the transmission requesting part without waiting for the next packet forming. Accordingly, each packet can be certainly transmitted within each requested time period for processing.

The set value calculating part calculates a total predicted value for the second timer interrupt used to calculate the another timer set value in advance, and the control information memorizing part stores the calculated value. Therefore, the process for calculating the another set value by transmission requesting part can be fast and easily performed.

The set value calculating part calculates the total predicted value for the second timer interrupt in advance. Therefore, the transmission requesting part can lessen the times of accessing the control information memorizing part. Then, the time lag at the time period from the periodic interrupt to the second packet or the packet after the second being requested to be transmitted is effectively reduced.

The set value calculating part calculates the total predicted value for the second timer interrupt at the system initialization. The calculated total predicted value for the second timer interrupt is stored in the memory area where the caching is not performed in the control information memorizing part. Therefore, the transmission requesting part can access the total predicted value for the second timer interrupt stored in the control information memorizing part at a fixed speed because the total predicted value is not in the cache. Then, the process time lag is reduced, and the packet is certainly requested to be transmitted within the requested time period for processing.

The transmission request time period calculates the above another timer set value by using the information stored in the control information memorizing part in advance. Since the predicted time value is used, the another timer set value meeting the actual process time can be obtained. Then, the process time lag is effectively reduced, and the packet is certainly requested to be transmitted within the requested time period for processing.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A transmission system in which a packet is formed and transmitted within a specific time period, comprising:
    (a) a periodic interrupt generating part for generating a periodic interrupt at intervals longer than the specific time period;
    (b) a relative time timer in which a specific timer set value is set, for generating an interrupt by measuring a specific elapse time based on the specific timer set value;
    (c) a control information memorizing part for memorizing control information used for calculating the specific elapse time measured by the relative time timer;
    (d) a set value calculating part for calculating the specific timer set value to be measured by the relative time timer, by using the control information memorized in the control information memorizing part;
    (e) a packet forming part, which is started when the periodic interrupt by the periodic interrupt generating part occurs, for setting the specific timer set value calculated by the set value calculating part in the relative time timer and forming a packet; and
    (f) a transmission requesting part, which is started when the interrupt by the relative time timer occurs, for transmitting the packet formed by the packet forming part.

2. The transmission system of claim 1, wherein the control information memorizing part memorizes at least the specific time period, the specific timer set value, and time information used for calculating the specific timer set value by the set value calculating part, as the control information,
    wherein the time information memorized in the control information memorizing part is predicted in advance and includes a relative-time-timer-starting-predicted-time-period from the periodic interrupt being generated by the periodic interrupt generating part to the specific timer set value being set up in the relative time timer by the packet forming part, and a transmission-starting-predicted-time-period from the interrupt being generated by the relative time timer to the packet being transmitted by the transmission requesting part.

3. The transmission system of claim 2, wherein the relative-time-timer-starting-predicted-time-period memorized in the control information memorizing part as the time information includes a first process time period from the periodic interrupt being generated by the periodic interrupt generating part to a starting of the packet forming part, and the transmission-starting-predicted-time-period memorized in the control information memorizing part as the time information includes a second process time period from the interrupt being generated by the relative time timer to a starting of the transmission requesting part,
    wherein each of the first process time period and the second process time period
    includes a delay time of H/W process, and the control information memorizing part memorizes a middle value between a minimum time period and a maximum time period of H/W process as a predicted delay time period, in advance in the time information.

4. The transmission system of claim 3, wherein the relative-time-timer-starting-predicted-time-period memorized in the control information memorizing part is divided into two of the predicted delay time period and a timer-set-predicted-time-period from a process starting of the packet forming part to the specific timer set value being set in the relative time timer.

5. The transmission system of claim 4, wherein the transmission-starting-predicted-time-period memorized in the control information memorizing part is divided into two of the predicted delay time period and a transmission-request-predicted-time-period from a process starting of the transmission requesting part to a packet transmission being requested.

6. The transmission system of claim 5, wherein the set value calculating part calculates the specific timer set value by using the specific time period, the timer-set-predicted-time-period, the transmission-request-predicted-time-period, and the predicted delay time period stored in the control information memorizing part.

7. The transmission system of claim 6, wherein the packet forming part forms one packet at one starting, and the transmission requesting part transmits one packet at one starting.

8. The transmission system of claim 6, wherein the set value calculating part calculates the specific timer set value at a system initialization and the control information memorizing part stores the specific timer set value in a memory area where caching is not performed.

9. The transmission system of claim 8, wherein the packet forming part obtains the specific timer set value by accessing the memory area where caching is not performed, and sets an obtained specific timer set value in the relative time timer.

10. The transmission system of claim 6, wherein the set value calculating part calculates the specific timer set value at the system initialization and the control information memorizing part includes a global register of a processor for memorizing the specific timer set value.

11. The transmission system of claim 6 further comprising an absolute time timer for controlling a current time,
    wherein the packet forming part forms packets, two and more than two, at one starting, obtains the current time from the absolute time timer, and stores an obtained current time in the control information memorizing part as a reference time, and
    the relative time timer in which another timer set value different from the specific timer set value is set, generates an interrupt by measuring a specific elapse time based on the another timer set value,
    the transmission requesting part obtains the current time from the absolute time timer, and the reference time and the control information memorized in the control information memorizing part, calculates the another timer set value to be measured by the relative time timer, by using obtained current time, reference time and control information, sets the another timer set value in the relative time timer and transmits one packet formed by the packet forming part at one starting.

12. The transmission system of claim 11, wherein the control information memorizing part memorizes a second-timer-set-predicted-time-period, which is a predicted time period from the current time being obtained from the absolute time timer by the transmission requesting part to the another timer set value being set in the relative time timer, as the time information, wherein the timer-set-predicted-time-period is divided into two time periods to be memorized, which are a current-time-obtaining-predicted-time-period from the starting of the packet forming part to the current time being obtained from the absolute time timer and a current-time-timer-set-predicted-time-period from the current time being obtained from the absolute time timer to the specific timer set value being set in the relative time timer, and each of requested time period needed for the above process is memorized to be corresponding to a packet number of packet formed by the packet forming part, and the transmission requesting part calculates the another timer set value by using the current time, the reference time, the second-timer-set-predicted-time-period, the current-time-obtaining-predicted-time-period, the transmission-request-predicted-time-period and the predicted delay time period stored in the control information memorizing part, and the process requested time period corresponding to the packet number of packet to be transmitted next.

13. The transmission system of claim 12, wherein a process of the transmission requesting part has a priority higher than a process of the packet forming part, and in a case of the interrupt by the relative time timer being generated during one of a second packet and a packet after the second packet being formed by the packet forming part, the transmission requesting part is started in order to precedently execute the process of the transmission requesting part.

14. The transmission system of claim 13, wherein the set value calculating part calculates a total predicted value of a second timer interrupt by using the process requested time period corresponding to the packet number of packet to be transmitted next, the current-time-obtaining-predicted-time-period, the second-timer-set-predicted-time-period, the transmission-request-predicted-time-period, and the predicted delay time period, and the control information memorizing part memorizes the total predicted value of the second timer interrupt in advance.

15. The transmission system of claim 14, wherein the set value calculating part calculates the total predicted value of the second timer interrupt at the system initialization, and the control information memorizing part stores the total predicted value of the second timer interrupt in the memory area where caching is not performed.

16. The transmission system of claim 15, wherein the transmission requesting part obtains the total predicted value of the second timer interrupt, the specific time period corresponding to the packet number of packet to be transmitted next and the reference time from the control information memorizing part, calculates the specific elapse time to be measured by the relative time timer, by using the current time obtained from the absolute time timer, and sets calculated specific elapse time in the absolute time timer.

17. A transmission method for a transmission system in which a packet is formed and transmitted within a specific time period, the method comprising:

generating a periodic interrupt at intervals longer than the specific time period;

generating an interrupt by measuring a specific elapse time based on a specific timer set value;

memorizing control information used for calculating the specific elapse time;

calculating the specific timer set value to be measured by a relative time timer, by using the control information;

when the periodic interrupt occurs, setting the specific timer set value in the relative time timer and forming a packet; and when the interrupt occurs, transmitting the packet.

* * * * *